(12) United States Patent
Osawa et al.

(10) Patent No.: US 6,565,066 B2
(45) Date of Patent: May 20, 2003

(54) GATE VALVE

(75) Inventors: Yoshio Osawa, Sakado (JP); Koichi Mori, Sakado (JP); Yuzuru Tamura, Fujisawa (JP)

(73) Assignees: Eagle Industry Co., Ltd., Tokyo (JP); NOK Corporation, Tokyo (JP)

( * ) Notice: Subject to any disclaimer, the term of this patent is extended or adjusted under 35 U.S.C. 154(b) by 45 days.

(21) Appl. No.: 09/839,412

(22) Filed: Apr. 23, 2001

(65) Prior Publication Data

US 2002/0000531 A1 Jan. 3, 2002

(30) Foreign Application Priority Data

Apr. 21, 2000 (JP) ........................................ 2000-126313

(51) Int. Cl.[7] .............................................. F16K 25/00
(52) U.S. Cl. ........................ 251/203; 251/158; 137/341
(58) Field of Search ........................ 137/341; 251/158, 251/203

(56) References Cited

U.S. PATENT DOCUMENTS 5,120,019 A    6/1992  Davis, Jr. ................... 251/193
5,626,324 A  * 5/1997  Nakamura et al. .......... 251/158
5,641,149 A  * 6/1997  Ito ............................. 251/158
5,755,255 A  * 5/1998  Iwabuchi .................... 137/341
6,082,706 A  * 7/2000  Irie ............................. 251/158
6,095,180 A  * 8/2000  Ishigaki et al. ............. 137/341

FOREIGN PATENT DOCUMENTS

JP          2613171         2/1997

* cited by examiner

*Primary Examiner*—David A. Scherbel
*Assistant Examiner*—Melvin A. Cartagena
(74) *Attorney, Agent, or Firm*—Jacobson Holman PLLC

(57) ABSTRACT

A gate valve includes: a valve plate; a valve rod which the valve plate is fixed to and is supported to be able to tilt; a seal bellows and a dust sealing portion; a stopper member; a tilting cam mechanism which converts supplied straight moving force into tilting force, and tilts the valve rod of which the straight movement is restricted at a closed position in the direction where the valve plate 2 seals an aperture; a seal-releasing cam mechanism which tilts the valve rod in the direction to release the sealing of the valve plate; and an air cylinder as an actuator which supplies the straight movement force for the tilting cam mechanism and the seal-releasing cam mechanism.

7 Claims, 17 Drawing Sheets

GATE VALVE

BACKGROUND OF THE INVENTION

1. Field of the Invention

The present invention relates to a gate valve which can open and close, and seal an aperture of a vacuum processing chamber. For example, the present invention relates to a gate valve which can open and close, and seal an aperture of a vacuum processing chamber to be used in a process of manufacturing a semiconductor device, etc.

2. Description of the Related Art

In dry-etching, sputtering and epitaxial wafer forming processes, etc. in manufacturing process of a semiconductor device, for example, there is used a vacuum processing device having a construction of a multi-chamber to which a plurality of vacuum processing chambers are connected as shown in FIG. 16.

In a vacuum processing device 301 in FIG. 16, a plurality of vacuum processing chambers 305 which conduct various kinds of processing are connected to an outer circumference of a conveying chamber 302 to which a wafer W is conveyed in and out. The movement between the conveying chamber 302 of the wafer W and each of vacuum processing chambers 305 is conducted through a gate G. The opening, closing and sealing of the gate G are conducted by a gate valve which is not shown in the drawings.

In the vacuum processing device 301 in FIG. 16, the wafer W is conveyed in the conveying chamber 302 by a conveying device which is not shown in the drawings through a conveying entrance 303 of a conveying channel 304, and is supported by a vacuum conveying robot 307 provided in the conveying chamber 302. When the wafer W is supported by the vacuum conveying robot 307, the conveying entrance 303 is closed, and a vacuum suction is conducted in the conveying chamber 302. At this time, each of said gate valves is in the state of sealing the respective gates. When the vacuum suction in the conveying chamber 302 is completed, each of the gate valves is actuated to open the gate G, and the wafer W is conveyed into a predetermined vacuum processing chamber by the vacuum conveying robot 307. For the processing in the vacuum processing chamber, each of the gate valves is actuated to close the gate G, and a predetermined processing is conducted on the wafer W. When the predetermined processing on the wafer W is completed, each of the gate valves is actuated to open the gate G, and the wafer W is carried out from the vacuum processing chamber by the vacuum conveying robot 307, and is automatically conveyed outside the vacuum processing device 301 through the conveying entrance 303.

As a gate valve 306 which can open and close, and seal the gate G in the above-mentioned vacuum processing device 301, the structures as shown in FIG. 17 and FIG. 18 are used.

In FIG. 17, a conveying chamber 202 is communicated with a vacuum processing chamber 203 through a gate G. The opening and closing of the gate G are conducted by a gate valve 201, and the gate valve 201 includes a valve plate 205 to conduct the opening and closing and sealing of the gate G, a valve rod 206 which has one end to which the valve plate 205 is fixed, and is supported to be capable of being moved straight and to be able to be inclined around a predetermined shaft 208, a seal bellows 207 which seals a space between the conveying chamber 202 and the valve rod 206, and an actuating means which is not shown in the drawings and moves straight or tilts the valve rod 206.

In FIG. 17, the gate valve 201 is in the state of opening the gate G. In order to close and seal the gate G, as shown in FIG. 18, the valve rod 206 is moved straight to be moved to the position where the valve plate 205 closes the gate G, and the valve rod 206 is tilted around a shaft 208. As a result, the valve plate 205 presses an O-ring 204 provided in the outer circumference of the gate G, so that the gate G is sealed.

However, in the gate valve 201 having the above-mentioned structure, for example, it is known that an air cylinder as a straight moving means and the valve rod 206 is connected through a cam mechanism, so that the tilting of the valve rod 206 is conducted.

For instance, a gate valve using such cam mechanism is disclosed in the official gazette of Japanese Patent No. 2613171.

The cam mechanism of the gate valve disclosed in the official gazette of Japanese Patent No. 2613171 is comprised of a pin which connects a yoke actuated straight by an air cylinder and a block fixed to a lower end portion of a valve rod, and a slanted elongate hole engaged with the pin.

In the cam mechanism having the construction, the pin slides with respect to the slanted elongate hole, and thus, a tilting force which tilts the valve rod is generated.

For instance, a gate valve using the cam mechanism is also disclosed in U.S. Pat. No. 5,120,019.

The cam mechanism disclosed in U.S. Pat. No. 5,120,019 is comprised of a cam plate including a cam surface which is moved straight by an air cylinder, and a cam follower comprised of a roller rotatably provided to a valve rod, and has the construction in which the roller is engaged with a cam surface of the straight moving cam plate so that the valve rod is tilted.

However, in the construction of the cam mechanism disclosed in the official gazette of Japanese Patent No. 2613171, because the pin slides over the inner circumferential surface of the slanted elongate hole, there is a disadvantage that a sliding friction is occurred therebetween and noise is easily generated, and thus, silence is insufficient.

Moreover, because the sliding friction is occurred between the pin and the inner circumferential surface of the slanted elongate hole, there is a disadvantage that the output of the air cylinder as an actuating means which actuates a cam mechanism needs to be raised, or it is difficult that the cam mechanism is smoothly operated, or the pin and the inner circumferential surface of the slanted elongate hole are easily worn, so that stable operation for long time period cannot be assured.

Further, in the cam mechanism of the construction disclosed in U.S. Pat. No. 5,120,019, because the roller as a cam follower rolls over the cam surface of the cam plate, it is difficult that the sliding friction is occurred, and generally, rolling friction is occurred. Accordingly, though the operation of the cam mechanism is comparatively smooth and the silence is excellent, because the roller needs to be rotatably supported by the supporting shaft, the structure becomes complicated, a bearing is needed between the roller and the supporting shaft, and there was a problem in the reliability of the bearing because a large radial load is applied to the bearing.

In addition, since there is a limitation to reduce a diameter of the roller, the structure was disadvantageous in view of compactness.

SUMMARY OF THE INVENTION

An object of the present invention is to provide a gate valve including a cam mechanism in which the structure thereof is simplified and small-sized so that low-price is possible.

A further object of the present invention is to provide a gate valve which has smooth operation so that high speed movement is possible, and has sufficient silence and high reliability.

Further, another object of the present invention is to provide a gate valve which can conduct securely the releasing operation from the sealing state of an aperture by a valve plate.

A gate valve of the present invention comprises: a valve plate which is provided in an air-tight chamber, and open and close an aperture of the air-tight chamber and seal the aperture by tilting with respect to said aperture; a valve rod which has one end to which said valve plate is fixed, and is supported to be movable in a predetermined straight movement direction for opening and closing the aperture and to be able to tilt around a predetermined tilting axis; a sealing means which seals a space between said valve rod and said air-tight chamber to be movable; a restriction means which restricts the straight movement in the direction to close said aperture of said valve plate at a closed position where the valve plate closes the aperture; a tilting cam mechanism which converts supplied straight moving force into tilting force, and tilts said valve rod of which the straight movement is restricted at said closed position around said tilting axis in the direction where said valve plate seals said aperture; a seal-releasing cam mechanism which is provided independently of said tilting cam mechanism, and tilts said valve rod around said tilting axis in the direction to release the sealing of said valve plate in the state of sealing said aperture according to the supply of the straight moving force in the direction to open said aperture; and an actuating means for supplying the straight moving force to said tilting cam mechanism and said seal-releasing cam mechanism.

Preferably, said tilting cam mechanism comprises: a rolling body; a rolling body supporting member which has a supporting surface supporting a rolling surface of said rolling body so that said rolling body can be rotated, and is actuated by said actuating means; a cam member for tilting which is disposed facing said rolling body supporting member, has a cam surface on which said rolling body rolls to tilt said valve rod, and is connected to said valve rod side; and a lubricant storing member including an opposing surface which faces a part of the rolling surface of the rolling body rotatably supported to said rolling body supporting member, and storing a lubricant in a gap formed between the rolling surface and the opposing surface.

Preferably, said seal-releasing cam mechanism comprises: a roller member; a supporting member rotatably supporting said roller member; and a cam member for releasing the seal including a cam surface on which said roller member rolls.

Said roller member and said supporting member are provided in said valve rod side, and said cam member for releasing the seal is provided in said actuating means side.

More preferably, said sealing means comprises: a seal bellows portion freely expanded and contracted which has one end fixed to said valve rod and the other end fixed to said air-tight chamber side; and a dust seal portion which said valve rod is inserted to and prevents a dust produced in the air-tight chamber from intruding into the seal bellows while allowing the tilting of said valve rod.

In the present invention, when the rolling body supporting member is moved straight by the actuating means in the direction where the valve plate closes the aperture, the valve rod is moved in the direction and the straight movement thereof is restricted at the closed position.

Further, when the rolling body supporting member is actuated, the rolling body rotatably supported on the supporting surface of the rolling body supporting member moves rolling over the cam surface of the cam member for tilting.

Consequently, the valve rod is tilted, and the aperture is sealed by the valve plate.

At this time, because the rolling body rotates with respect to the supporting surface of the rolling body supporting member, the sliding friction is generated between the rolling body and the supporting surface, and the rolling friction is generated between the rolling body and the cam surface of the cam member for tilting.

Meanwhile, because a lubricant is stored between the opposing surface of the lubricant storing member and a portion of the rolling surface of the rolling body, when the rolling body rolls over the cam surface, it rotates with respect to the opposing surface.

When the rolling body rotates with respect to the opposing surface, the lubricant is attached to the rolling surface so that the whole circumference of the rolling surface becomes covered with the lubricant.

Accordingly, the space between the rolling body and the cam surface of the cam member for tilting is lubricated, and the rolling friction therebetween is reduced.

Further, the lubricant attached to the rolling surface is supplied between the rolling body and the supporting surface of the rolling body supporting member, so that the space between the rolling surface and the supporting surface is lubricated, and sliding friction therebetween is reduced.

After the aperture is sealed by the valve plate, when the valve rod is actuated in the direction to open the aperture of the air-tight chamber in the sealed state, the seal-releasing cam mechanism is operated.

Specifically, the roller member rotatably supported to the supporting member rolls over the cam surface of the cam member for releasing the seal, so that the valve rod is compulsively tilted in the direction to release the sealing of the aperture.

Accordingly, even in case where the seal member provided between the valve plate and the aperture is adhered by the heat, etc. or in case where the pressure difference which affects to strongly press the valve plate toward the aperture exists between the air-tight chamber and the atmosphere, the sealed state of the aperture by the valve plate can be securely released.

Also, in the present invention, the sealing means is constructed by the seal bellows and the dust seal. For example, when the dust comprised of deposition compounds produced in the air-tight chamber or a part of destroyed product, etc. intrudes into the seal bellows and inserted to the expansion and contraction portion of the seal bellows, cracks are easily occurred in the seal bellows, and it cannot perform the sealing function in some occasions. In those occasions, the dust seal prevents the dust from intruding into the seal bellows so that such disadvantages can be suppressed.

BRIEF DESCRIPTION OF THE DRAWINGS

An embodiment of the present invention will be described with reference to the accompanying drawings in which:

FIG. 8 is a diagram illustrating the structure of a roller supporting member 38.

DETAILED DESCRIPTION OF THE PREFERRED EMBODIMENTS

Figure 1:
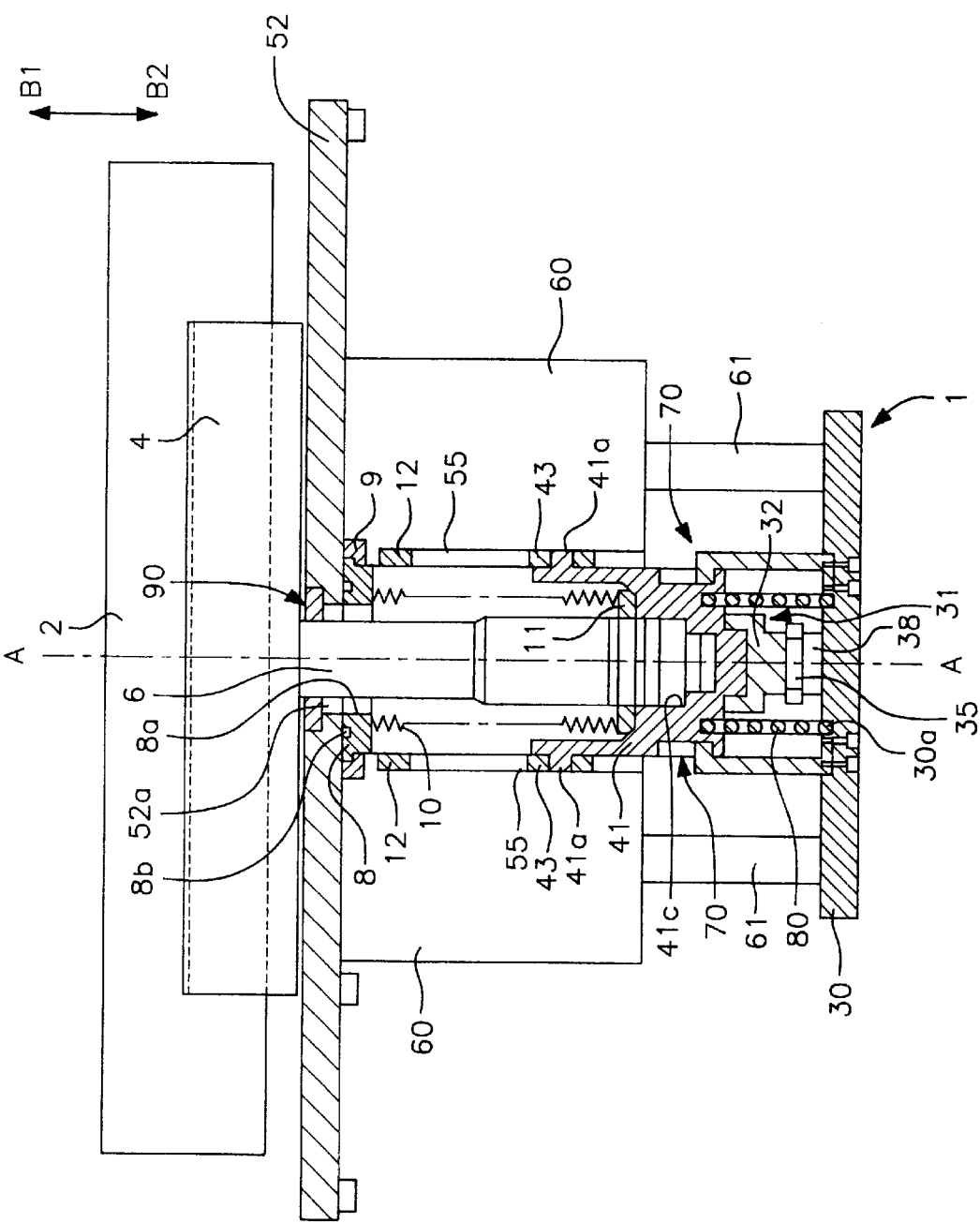
FIG. 1 is a cross-sectional view illustrating the construction of a gate valve according to an embodiment of the present invention.
Figure 2:
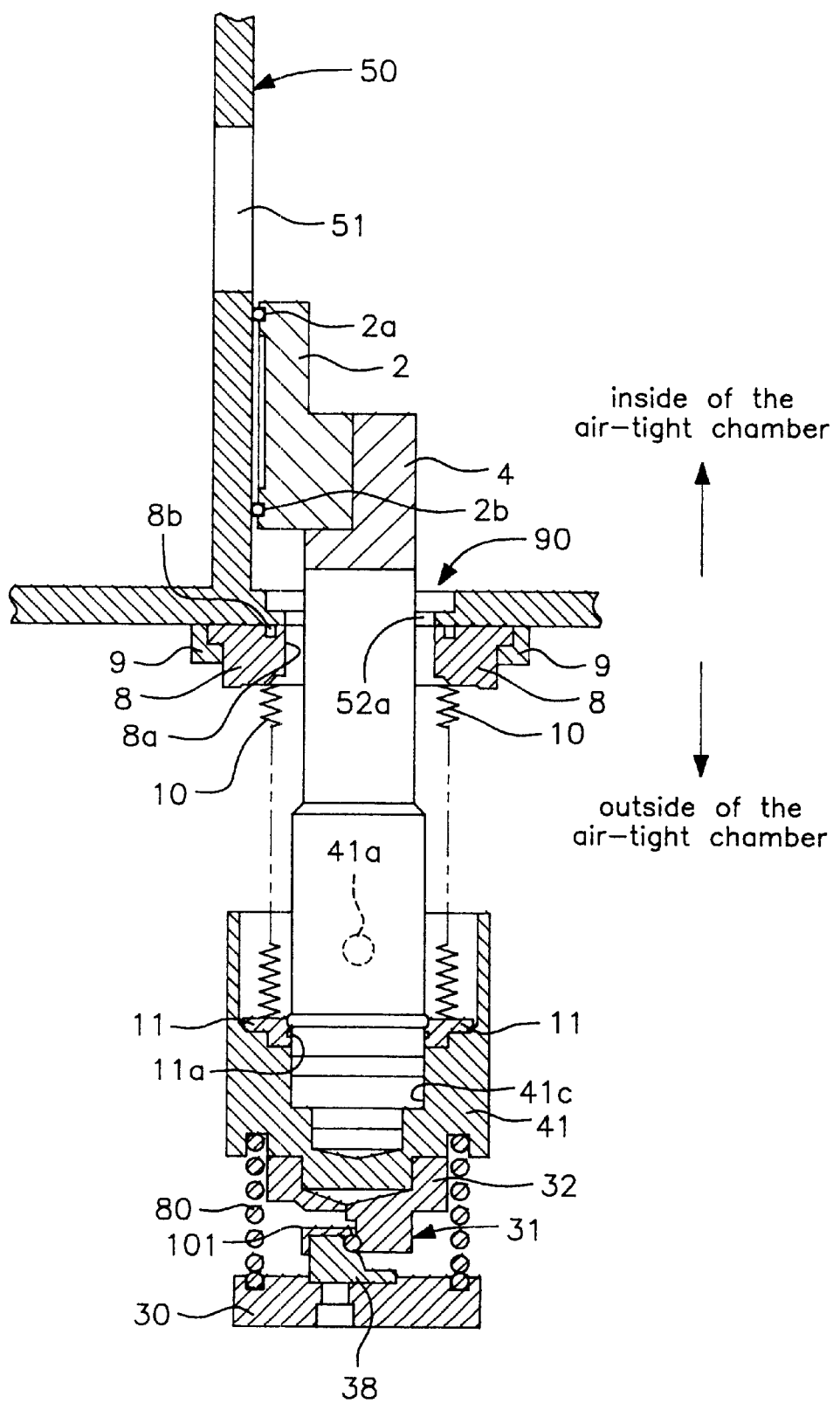
FIG. 2 is a cross-sectional view taken along the line A—A in FIG. 1.

FIG. 1 is a cross-sectional view illustrating the construction of a gate valve according to an embodiment of the present invention, and FIG. 2 is a cross-sectional view seen from the line A—A in FIG. 1.

The gate valve 1 shown in FIG. 1 and FIG. 2 comprises a valve plate 2, a valve rod 6 connected to the valve plate 2 through a connecting member 4, a seal bellows 10, a dust seal portion 90, a tilting cam mechanism 31, a seal-releasing cam mechanism 70, an air cylinder 60 and a coil spring 80.

Here, the valve plate 2 corresponds to a valve plate of the present invention; the valve rod 6 to a valve rod of the present invention; the seal bellows 10 and the dust seal portion 90 to a sealing means of the present invention; the tilting cam mechanism 31 to a tilting cam mechanism of the present invention; the seal-releasing cam mechanism 70 to a seal-releasing cam mechanism of the present invention; and the air cylinder 60 to an actuating means of the present invention, as a specific example, respectively.

The valve plate 2 is made of a planar member, and can open and close the aperture 51 of the air-tight chamber 50, and in addition, can seal the aperture 51 through an O-ring 2a by tilting with respect to the aperture 51. In the present embodiment, though the valve plate 2 is made of a planar member, in case where the aperture has a curved shape, the valve plate shape can be changed to fit the aperture shape. And, as a material for forming the valve plate 2, a metallic material which produces as little particles as possible and does not discharge gas, etc. is preferable. The connection between the valve plate 2 and the connecting member 4 is conducted by, for example, a bolt.

And, the O-ring 2a is inserted to the so-called dovetail groove 2b for preventing disengagement formed at the valve plate 2.

The valve rod 6 has one end fixed to the valve plate 2 through the connecting member 4, and is installed such that it protrudes outside the airtight chamber from an insertion hole 52a of the attaching portion 52 of the air-tight chamber 50 and an insertion hole 8a of an attaching member 8 attached to the attaching portion 52 through an O-ring 8b. The attaching member 8 is fixed to the attaching portion 52 by a ring-shaped fixing member 9 fitted into the outer circumference thereof.

And, the valve rod 6 has the other end connected to a supporting member 41, and is supported by the supporting member 41. As the supporting member 41 is rotatable around a supporting shaft 41a, the valve rod 6 is also able to be inclined around the supporting shaft 41a. The supporting shaft 41a corresponds to a specific example of a tilting shaft of the present invention.

Moreover, the connection between the valve rod 6 and the connecting member 4 is made by for example a welding. As a material for forming the valve rod 6, a metallic material which produces as little particles as possible and does not discharge gas, etc. is preferable.

The seal bellows is an member for sealing the space between the inside of the air-tight chamber 50 and the valve rod 6, and can be expanded and contracted according to the straight movement and tilt of the valve rod 6.

Moreover, the seal bellows 10 is made of a metallic material, maintains an air-tight condition in an end portion of the attaching member 8, and is fixed by a bonding means, for example, a welding.

The other end portion of the seal bellows 10 is fixed to a fixed ring member 11 fixedly fitted into the valve rod 6, by means of the bonding means, for example, the welding, etc. And, the O-ring 11a is interposed between the fixed ring member 11 and the valve rod 6.

Thereby, even though the valve rod 6 moves straight and tilts, the air-tight chamber can be sealed, and contaminants such as particles from outside can be prevented from intruding into the air-tight chamber.

And, for instance, the seal bellows 10 is made of a metallic material.

The dust seal portion 90 is fixedly fitted into a fitting recess 52b formed at the inside of the air-tight chamber of the insertion hole 52a of the attaching portion 52, and functions so as to prevent a dust produced in the air-tight chamber 50 from intruding into the inside of the seal bellows 10 while allowing the tilting of the valve rod 6. Also, in FIG. 1 and FIG. 2 illustrate simply the arrangement of the dust seal portion 90.

In response to allow the tilting of the valve rod 6, a diameter of the insertion hole 52a of said attaching portion 52 necessarily needs to be larger than a shaft diameter of the valve rod 6, and there exists comparatively large gap. In some occasions, wafer crushes produced in the air-tight chamber 50 or deposition materials piled in the air-tight chamber 50 intrudes into the seal bellows 10 through the gap, and further, in other occasions, the intruded contaminants destroy the seal bellows 10.

In the present embodiment, the dust seal portion 90 is provided in the insertion hole 52a, so that the dust such as wafer crushes or deposition materials is prevented from intruding into the seal bellows 10 through the gap.

Figure 3:
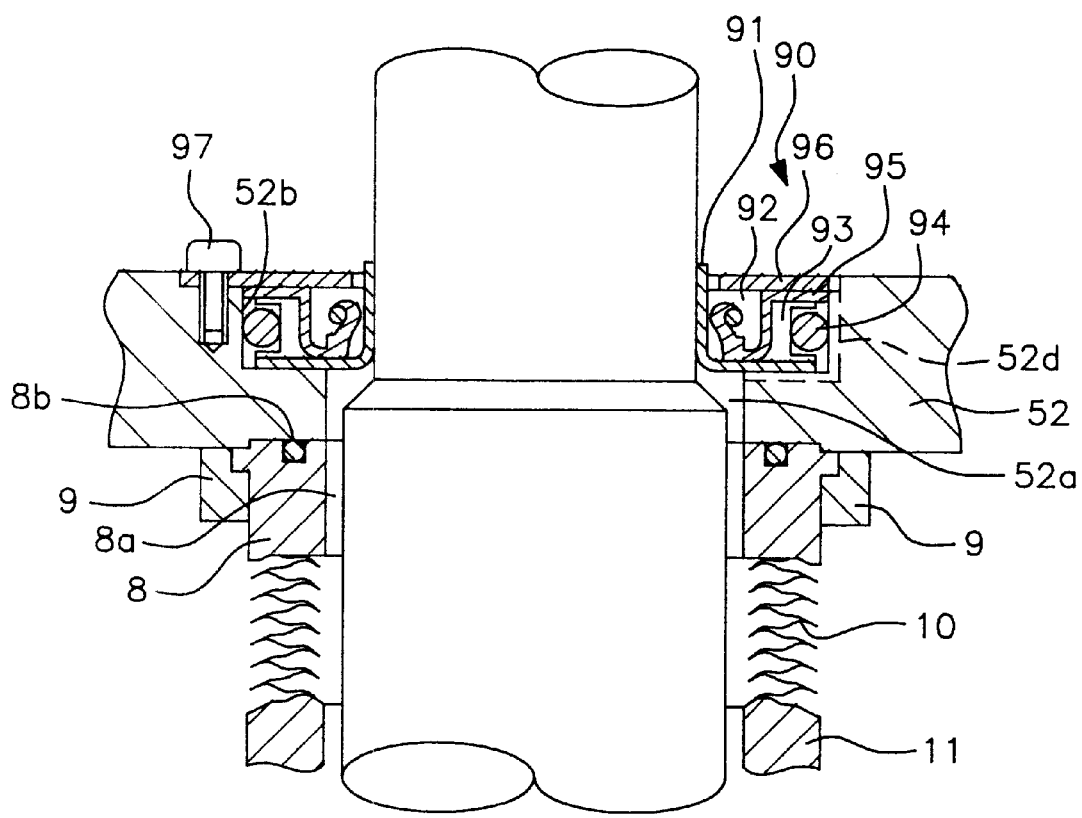
FIG. 3 is a cross-sectional view illustrating the detailed structure of a dust seal portion 90.
Figure 4:
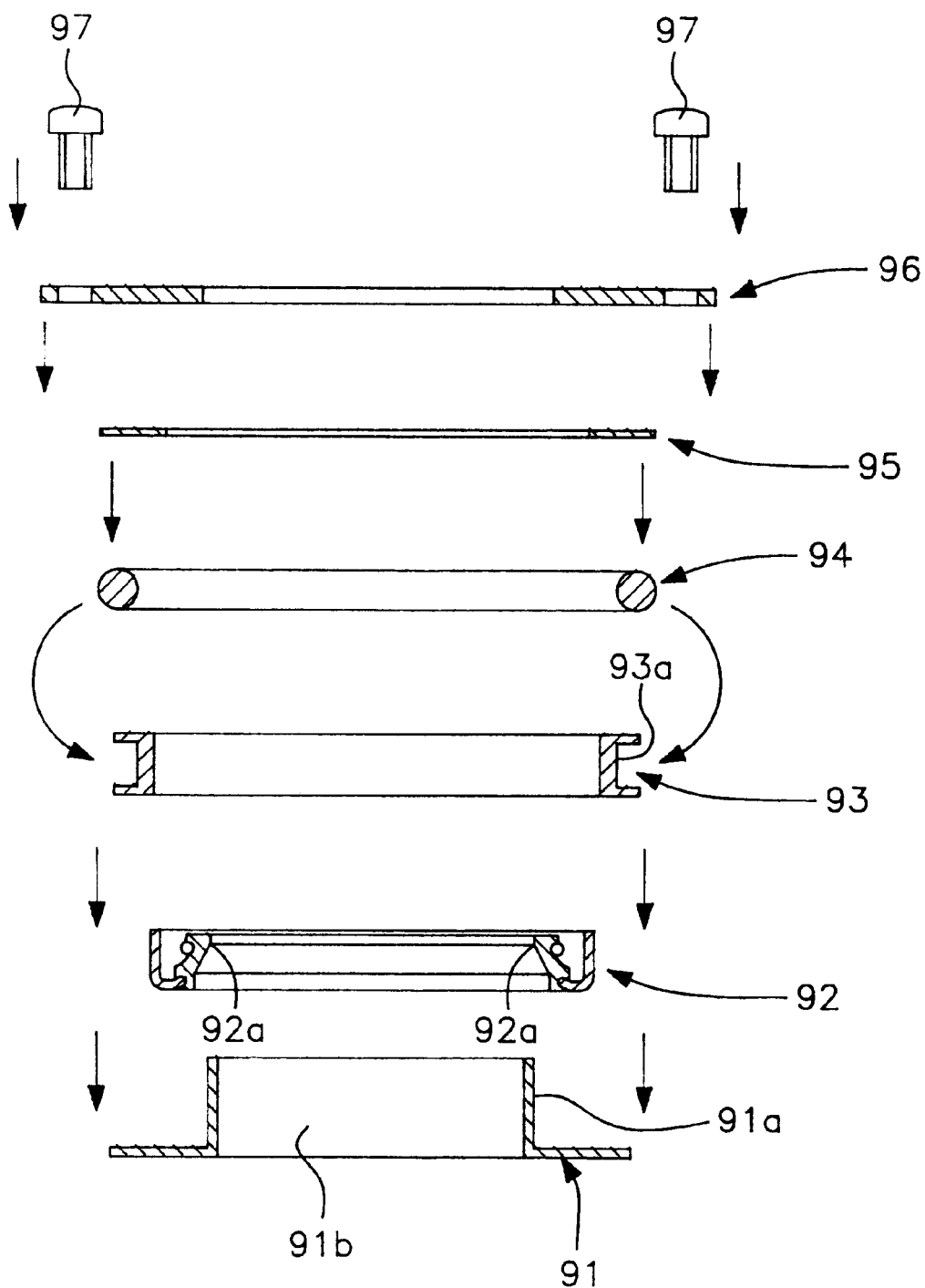
FIG. 4 is a cross-sectional view illustrating the state that each component constituting the dust seal portion 90 is exploded.

FIG. 3 is a cross-sectional view illustrating the detailed structure of the dust seal portion 90, and FIG. 4 is a diagram illustrating the state dismantling each component constituting the dust seal portion 90.

As shown in FIG. 3 and FIG. 4, the dust seal portion 90 comprises a flex bush 91, a seal member 92, a thrust joint 93, an O-ring 94, a thrust washer 95, a cover 96 and a bolt 97.

In the dust seal portion 90, the flex bush 91 is fitted into the fitting recess 52b formed at the air-tight chamber 50 side of the insertion hole 52a of the attaching portion 52.

A diameter of an insertion hole 91b of the valve rod 6 of the tubular portion 91a of the flex bush 91 is formed to be a little larger than that of the valve rod 6.

A lip portion 92a around the inner circumference of the seal member 92 is fitted into the outer circumference of the tubular portion 91a of the flex bush 91.

The inner circumference of the thrust joint 93 is fitted into the outer circumference of the seal member 92.

The O-ring 94 is fitted into a groove 93a around the outer circumference of the thrust joint 93.

The cover 96 is placed at one end surface of the thrust joint 93 through the thrust washer 95, and is fixed to a surface in the air-tight chamber 50 side of the attaching portion 52 by the bolt 97.

A minute gap is occurred between the valve rod 6 and the flex bush 91, and the valve rod 6 and the flex bush 91 do not slide in case where the valve rod 6 moves only in the straight direction.

In case where the valve rod 6 is tilted, though the tubular portion 91a of the flex bush 91 and the valve rod 6 are in contact with each other so that the flex bush 91 follows the movement of the valve rod 6, the movement of the flex bush 91 is absorbed by the elasticity of the O-ring 94 and the lip portion 92a of the seal member 92.

Consequently, when the valve rod 6 returns to untilted state from tilted state, the flex bush 91 returns to a nearly constant position with respect to the valve rod 6. In this way, since there exists the flex bush 91, the dusts such as wafer crushes or deposition materials produced in the airtight chamber 50 from intruding into the seal bellows 10 can be prevented.

Moreover, an air pumping is conducted in the air-tight chamber 50 side and the inside of the seal bellows 10 by the expansion and contraction of the seal bellows 10.

Thus, a ventilation hole 52d which communicates the air-tight chamber 50 side with the inside of the seal bellows 10 is formed at the attaching portion 52.

By such construction, even in case of providing the dust seal portion 90, unnecessary pressure is not applied to the seal bellows 10, so that the seal bellows 10 is not deformed.

A supporting member 41 is a cylindrical member having a bottom, an insertion hole 41c fitting and inserting the valve rod 6 is formed at the bottom portion thereof, and supporting shafts 41a are formed respectively at the opposite position in the outer circumference.

In view that the supporting member 41 is a cylindrical member, it can accommodate the seal bellows 10 therein expanded and contracted by the straight movement of the valve rod 6.

The respective supporting shafts 41a formed at the supporting member 41 is rotatably supported by a bearing member 43.

Thus, the supporting member 41 can tilt around the supporting shaft 41a, and the valve rod 6 can also tilt.

The bearing member 43 which rotatably supports the supporting shaft 41a is movably supported to a groove-shaped rail 55 formed at the lateral surface of an air cylinder 60.

Therefore, the supporting member 41 can move freely along the straight movement directions B1 and B2, and the valve rod 6 can move freely in the straight movement directions B1 and B2.

Stopper members 12 are provided respectively in the end portions in the air-tight chamber 50 side of the rail 55. Also, the stopper member 12 corresponds to a specific example of a restriction member of the present invention.

The stopper member 12 restricts the straight movement of the supporting member 41 (the valve rod 6) by making a contact with the bearing member 43, when the valve plate 2 moves in the straight movement direction B1, that is, straight in the direction to close the aperture 51.

The stopper member 12 can be made of for instance, a resin material so as to ease the impact by the bumping with the bearing member 43.

The air cylinders 60 are disposed respectively at the symmetrical position with respect to the valve rod 6. The air cylinders 60 are fixed to the outside surface of the attaching portion 52 of the air-tight chamber 50 by a fastening means such as the bolt.

The air cylinders 60 have piston rods 61 expanded and contracted by a compressed air, and the piston rods 61 are fixed respectively to a connecting plate 30.

The piston rod 61 of the air cylinder 60 is expanded and contracted in the straight movement directions B1 and B2, and the connecting plate 30 also moves in the straight movement directions B1 and B2.

A coil spring 80 is interposed between the supporting member 41 and the connecting plate 30 to connect each other, and functions as a elastic member which maintains constantly the relative positional relationship of the supporting member 41 and the connecting plate 30, while allowing a elastic tilt of the supporting member 41 around the supporting shaft 41a.

The coil spring 80 has one end fixedly fitted into a fixing groove 41h of the end portion of the supporting member 41 and the other end fixedly fitted into the fixing groove 30a formed at the connecting plate 30.

Cam Mechanism for Releasing the Seal

A seal-releasing cam mechanism 70 is provided in the both side portions of the supporting member 41 with respect to the straight movement directions B1 and B2, and tilts the valve rod 6 in the direction where the sealing of the valve plate 2 is released according to the supply of a straight moving force in the direction where the valve plate 2 opens the aperture 51.

Figure 5:
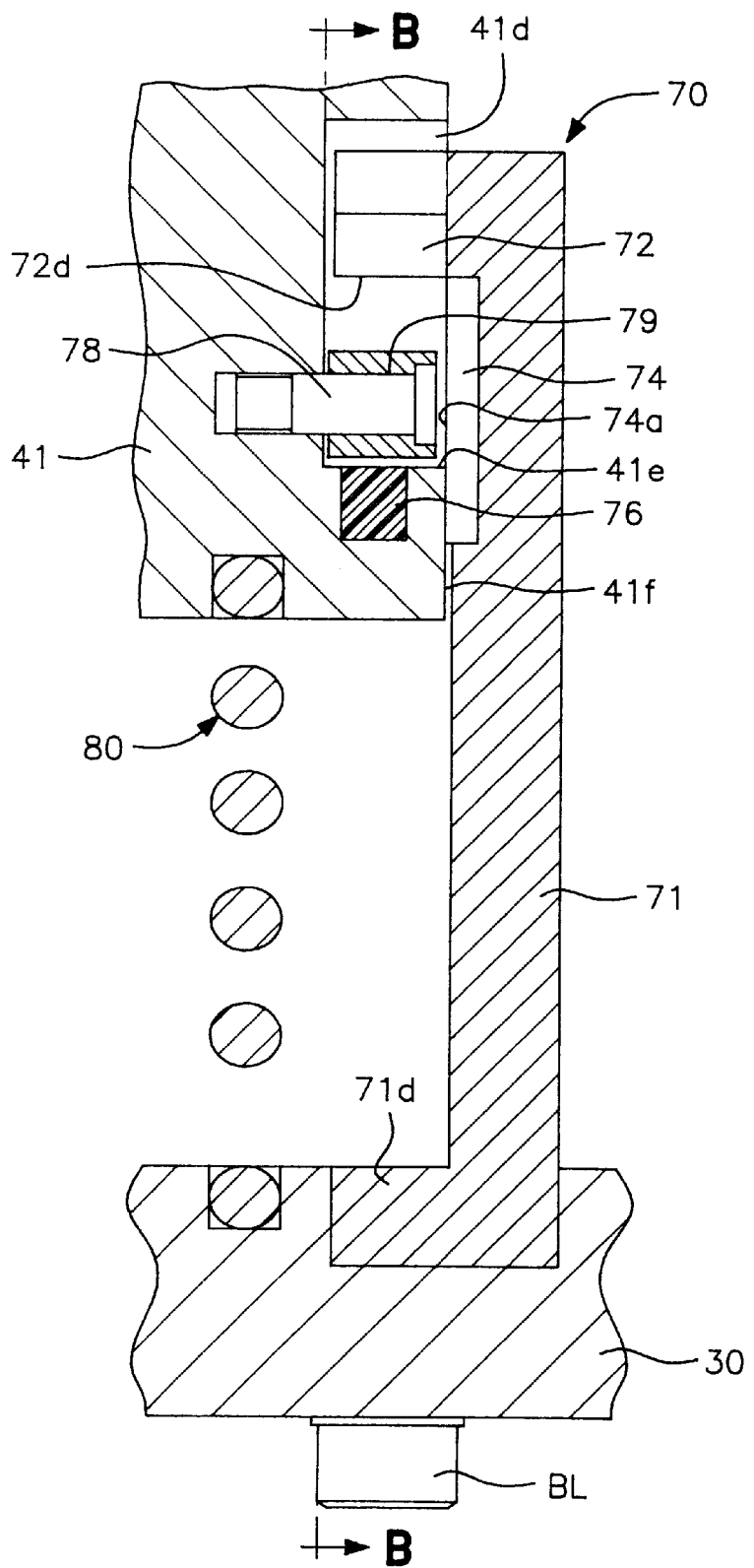
FIG. 5 is a cross-sectional view illustrating the detailed structure of a seal-releasing cam mechanism 70.
Figure 6:
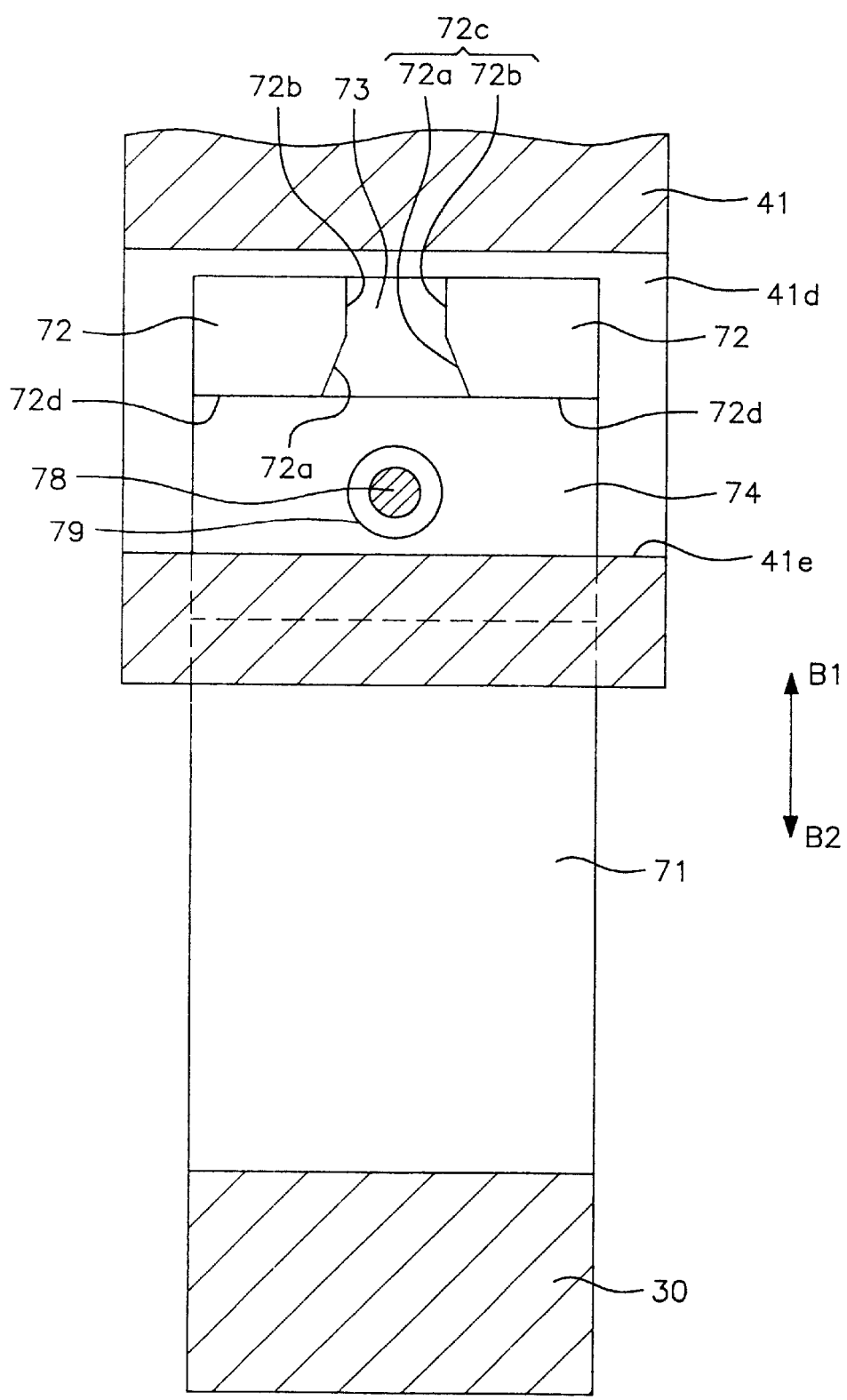
FIG. 6 is a cross-sectional view seen from the line B-B in FIG. 5.

FIG. 5 is a cross-sectional view enlarging the seal-releasing cam mechanism 70 shown in FIG. 1, and FIG. 6 is a cross-sectional view seen from the arrow B—B in FIG. 5.

As shown in FIG. 5 and FIG. 6, the seal-releasing cam mechanism 70 comprises a guide member 71, a pin-shaped supporting member 78 provided in the recess 41d formed at the supporting member 41, and a roller member 79 rotatably supported to the supporting member 78.

Herein, the guide member 71 corresponds to a cam member for releasing the seal of the present invention; the supporting member 78 to a supporting member of the present invention; and the roller member 79 to a roller member of the present invention, as a specific example, respectively.

The guide member 71 has a lower end portion 71a connected to the connecting plate 30 by a bolt BL, and comprises two protruding portions 72 protruded so as to oppose the supporting member 41 at an upper end portion in the figure, and the two protruding portions 72 are accommodated in a recess 41d formed at the lateral surface of the supporting member 41.

The opposing surfaces of the protruded portions 72 are comprised of a planar portion 72b following the straight movement directions B1 and B2 and an inclined surface 72a continuous to the planar portion 72b.

The planar portion 72b and the inclined surface 72a of one of the protruded portions 72 constitute the cam surface 72c. The cam surface 72c is shaped such that it does not influence the tilt movement when the valve plate 2 seals the aperture 51, and is shaped such that the inclined surface 72a approaches or is in contact with the roller member 79 in the state that the sealing of the aperture 51 is completed by the valve plate 2.

And the lower end surface of the protruded portions 72 is comprised of a contact surface which is in contact with a lower lateral surface 41e of the recess 41d of the supporting member 41 when the guide member 71 moves straight in the B2 direction. Namely, when the guide member 71 moves straight in the arrow B2 direction, the contact surface 72d of the protruded portions 72 moves straight the supporting member 41 together with the guide member 71 in the B2 direction.

A thrust washer 74 is embedded adjacently to the lower end portion of two protruded portions 72 of the guide member 71. For instance, the thrust washer 74 is made of a material having a low sliding resistance such as a brass containing a carbon, and an opposing surface 74a opposing the supporting member 41 and a lateral surface 41f of the supporting member 41 are in contact with each other, and the opposing surface 74a slides according to the straight movement in the B1 and B2 directions.

An impact interference member 76 is provided at a part of the lower lateral surface 41e of the recess 41d of the supporting member 41, and the impact interference member 76 is made of a material excellent in impact relieving capability for example such as rubber material, synthetic resin.

The impact interference member 76 functions to relieve the impact when the guide member 71 moves straight in the B2 direction and the contact surface 72d of the protruded portions 72 bumps with the lower lateral surface 41e of the recess 41d of the supporting member 41.

The supporting member 78 is screwed to a screw hole formed in the recess 41d of the supporting member 41.

The roller member 79 is rotatably supported to the supporting member 78, and rolls over the cam surface 72c of the protruded portions 72 of the guide member 71.

Further, a diameter of the roller member 79 is a little smaller than the distance between the planar portions 72b of the two protruded portions 72.

The roller member 79 is placed between the planar portions 72b of the two protruded portions 72, so that it is engaged with the planar portions 72b, thereby the tilting of the supporting member 41 is restricted and the state that the valve rod 6 is erected is maintained.

Cam Mechanism for Tilting

A tilting cam mechanism 31 is provided between said supporting member 41 and the connecting plate 30, moves straight the valve rod 6 by the straight moving force supplied from the air cylinder 60 through the connecting plate 30, and tilts the valve rod 6 of which the straight movement is restricted at a closed position where the supplied straight moving force is converted into a tilting force so that the valve plate 2 closes the aperture 51, in the direction where the valve plate 2 seals the aperture 51 around the supporting shaft 41a.

Figure 7:
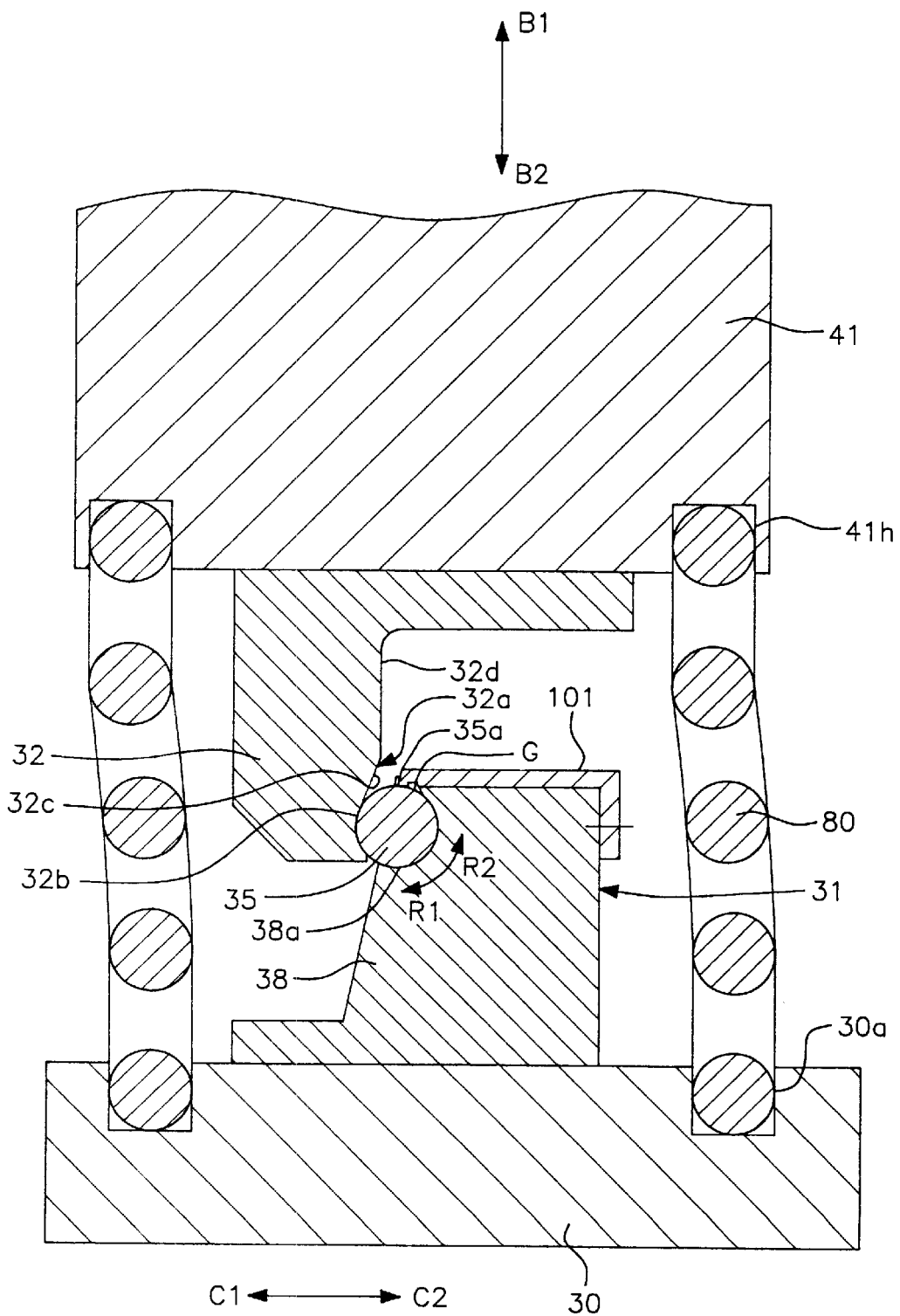
FIG. 7 is a cross-sectional view illustrating the detailed structure of a tilting cam mechanism 31.

FIG. 7 is a cross-sectional view illustrating the detailed structure of a tilting cam mechanism 31.

In FIG. 7, the tilting cam mechanism 31 comprises a cam member 32 fixed to the lower end portion of the supporting member 41, a roller member 35, a roller supporting member 38 fixed at a position opposing the cam member 32 of the connecting plate 30, and a lubricant storing member 101 provided at the roller supporting member 38.

Here, the roller member 35 corresponds to a rolling body of the present invention; the roller supporting member 38 to a rolling body supporting member of the present invention; the cam member 32 to a cam member for tilting of the present invention; and the lubricant storing member 101 to a lubricant storing member of the present invention, as a specific example, respectively.

The cam member 32 comprises a predetermined-shaped cam surface 32a comprised of smoothly continuous curved surface and planar surface.

The cam surface 32a comprises for example a supporting portion 32b comprised of a recess-shaped curved surface which can support the roller 35, an inclined surface 32c comprised of a curved surface which generates the tilting force required for the valve rod 6 (the supporting member 41) by the rolling of the roller 35, and a planar portion 32d comprised of a plane following the straight movement directions B1 and B2.

Consequently, by way of the rolling of the roller 35 on the cam surface 32a, the relative positional relationship of the straight movement directions B1 and B2 between the cam member 32 and the roller supporting member 38 is changed, and at the same time, the relative positional relationship of the tilting directions C1 and C2 is changed, and the cam surface 32a tilts the valve rod 6 around the supporting shaft 41a of the supporting member 41.

The roller 35 is made of a cylindrical body, and comprises a rolling surface 35a comprised of cylindrical surface.

The roller 35 rolls over the cam surface 32a of said cam member 32, and rotates while sliding the supporting surface 38a of the roller supporting member 38, and a heavy load is applied thereon.

Accordingly, it is preferable that the roller 35 uses a metallic material having comparatively high strength and excellent abrasion resistance capability.

Moreover, ring members which are not shown in the drawings are fixedly fitted into the both end portions of the roller 35 in the axial direction, and the ring members are engaged with the roller supporting member 38, so that the movement of the roller 35 in the axial direction is restricted with respect to the supporting surface 38a of the roller supporting member 38.

Figure 8A:
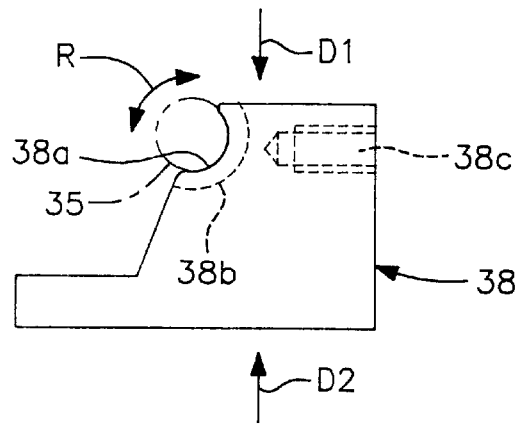
FIG. 8(a) is a cross-sectional view thereof.
Figure 8B:
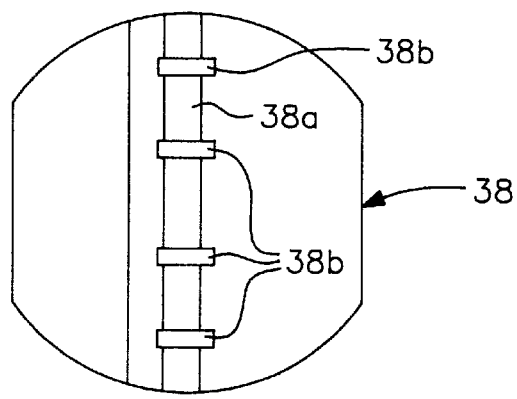
FIG. 8(b) is a top view of a roller supporting member 38 shown in FIG. 8(a) seen from the arrow D1 direction.
Figure 8C:
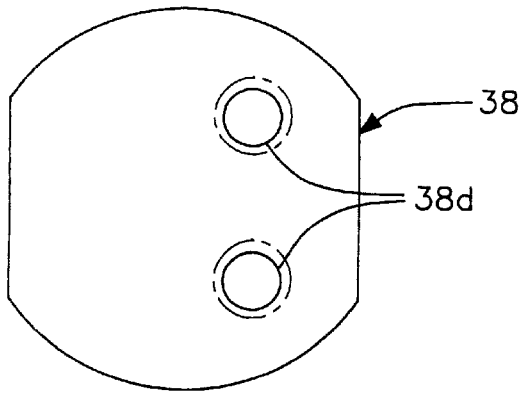
FIG. 8(c) is a bottom view of a roller supporting member 38 shown in FIG. 8(a) seen from the arrow D2 direction.

FIG. 8 is a diagram illustrating the structure of the roller supporting member 38, FIG. 8(a) is a cross-sectional view thereof, FIG. 8(b) is a top view of the roller supporting member 38 shown in FIG. 8(a) seen from the arrow D1 direction, and FIG. 8(c) is a bottom view of the roller supporting member 38 shown in FIG. 8(a) seen from the arrow D2 direction.

As shown in FIG. 8, the roller supporting member 38 comprises a supporting surface 38a supporting the rolling surface 35a of the roller 35, and the roller 35 is supported to be rotatable in the R direction by the supporting surface 38a.

And, the roller supporting member 38 has a screw hole 38d formed on the bottom surface thereof, and a bolt is screwed to the screw hole 38d, so that the roller supporting member 38 is fixed to the connecting plate 30.

Because the roller supporting member 38 is fixed to the connecting plate 30, it can be actuated directly in the straight movement directions B1 and B2.

Further, a screw hole 38c for fixing said lubricant storing member 101 is formed at the lateral surface of the roller supporting member 38.

As shown in FIG. 8(b), the supporting surface 38a of the roller supporting member 38 comprises a plurality set of groove portions 38b formed along the rotational direction R of the roller 35.

The groove portions 38b are used to contain the lubricant G stored by the lubricant storing member 101.

Figure 9A:
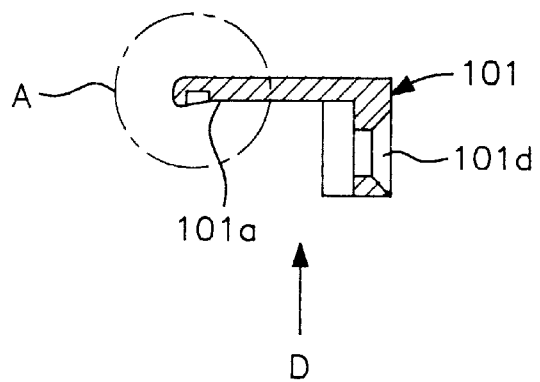
FIG. 9 is a diagram illustrating the structure of a lubricant storing member 101.
Figure 9B:
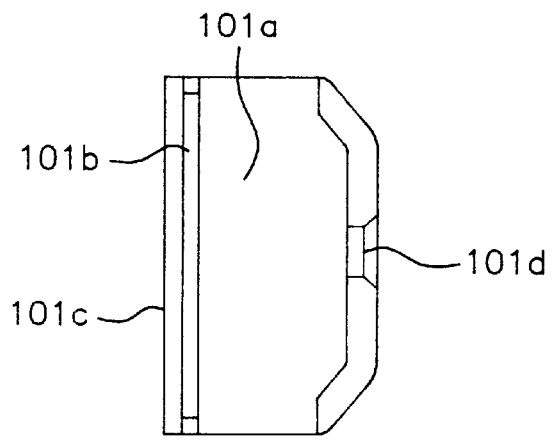
Figure 9C:
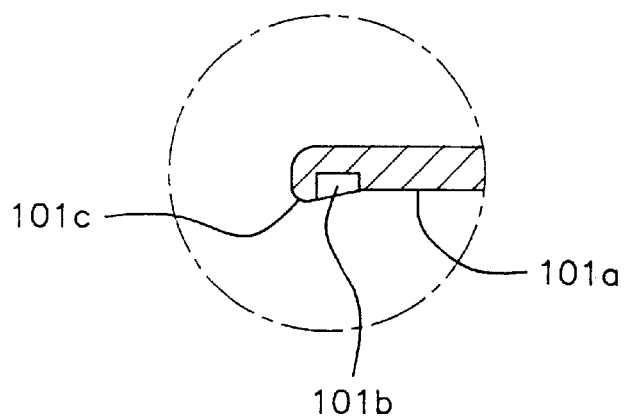

FIG. 9 is a diagram illustrating the structure of the lubricant storing member 101, FIG. 9(a) is a cross-sectional view thereof, FIG. 9(b) is a bottom view of the lubricant storing member 101 shown in FIG. 9(a) seen from the arrow D direction, and FIG. 9(c) is a diagram enlarging the circle A in FIG. 9(a).

In FIG. 9, the lubricant storing member 101 is comprised of a roughly L-shaped cross sectional member.

The lubricant storing member 101 is fixed to the roller supporting member 38 by screwing the bolt to the screw hole 38c of the roller supporting member 38 through a through-hole 101d formed at the one side of the L-shaped member.

Moreover, one surface in the other side of the L-shaped member of the lubricant storing member 101 is comprised of an opposing surface 101a opposing a part of the rolling surface 35a of the roller 35, and the lubricant G is stored in the gap formed between the opposing surface 101a and the rolling surface 35a of the roller 35.

A protruded portion 101c protruding from the opposing surface 101a is formed at the front end portion of the opposing surface 101a of the lubricant storing member 101.

A recess 101b recessed with respect to the rolling surface 35a of the roller 35 adjacent to the protruded portion 101c is formed at the front end portion of the opposing surface 101a of the lubricant storing member 101.

As can be seen from FIG. 9(c), the protruded portion 101c and the recess 101b of the lubricant storing member 101 are extended along the generatrix line of the rolling surface 35a of the roller 35, and are opposed to almost whole areas of the axial direction of the rolling surface 35a of the roller 35.

The protruded portion 101c and the recess 101b of the lubricant storing member 101 constitute the lubricant storing region storing the lubricant G by the unevenness thereof.

As shown in FIG. 7, the lubricant G is stored in the gap formed between the opposing surface 101a, the protruded portion 101c and the recess 101b of the lubricant storing member 101 and the rolling surface 35a of the roller 35.

Namely, the protruded portion 101c adjacent to the rolling surface 35a of the roller 35 is provided at the front end portion of the opposing surface 101a of the lubricant storing member 101, thereby, when the roller 35 rotates in the R2 direction shown in FIG. 7, the lubricant G stored in the gap between the opposing surface 101a and the rolling surface 35a of the roller 35 is prevented from being attached to the rolling surface 35a of the roller 35 and conveyed in large quantities.

The protruded portion 101c of the opposing surface 101a of the lubricant storing member 101 restricts the amount of the lubricant G attached to the rolling surface 35a of the roller 35, and functions such that the attached amount becomes constant.

Also, the protruded portion 101c and the recess 101b is formed at the opposing surface 101a of the lubricant storing member 101, thereby much larger amount of the lubricant G can be stored comparing to the case that the opposing surface 101a is flat.

For example, grease made of a lubricant in a semi-solid state is used for the lubricant G.

Namely, the grease in the middle state of liquid and solid is used for the lubricant G, and thus, the lubricant can be stored in a gap between the opposing surface 101a of the lubricant storing member 101 and the rolling surface 35a of the roller 35.

The lubricant storing member 101 is made of resin material such as for example, Duracon, etc. or metallic material, and it is processed by molding in case of the resin material and is processed by cutting in case of the metallic material.

Next, the operation of the gate valve 1 having said construction will be described below.

The gate valve 1 shown in FIG. 1 and FIG. 2 is in the state of opening the aperture 51, but, from this state, actuates the air cylinder 60 to move straight the roller supporting member 38 in the straight movement direction B1 to close the aperture 51.

Figure 10:
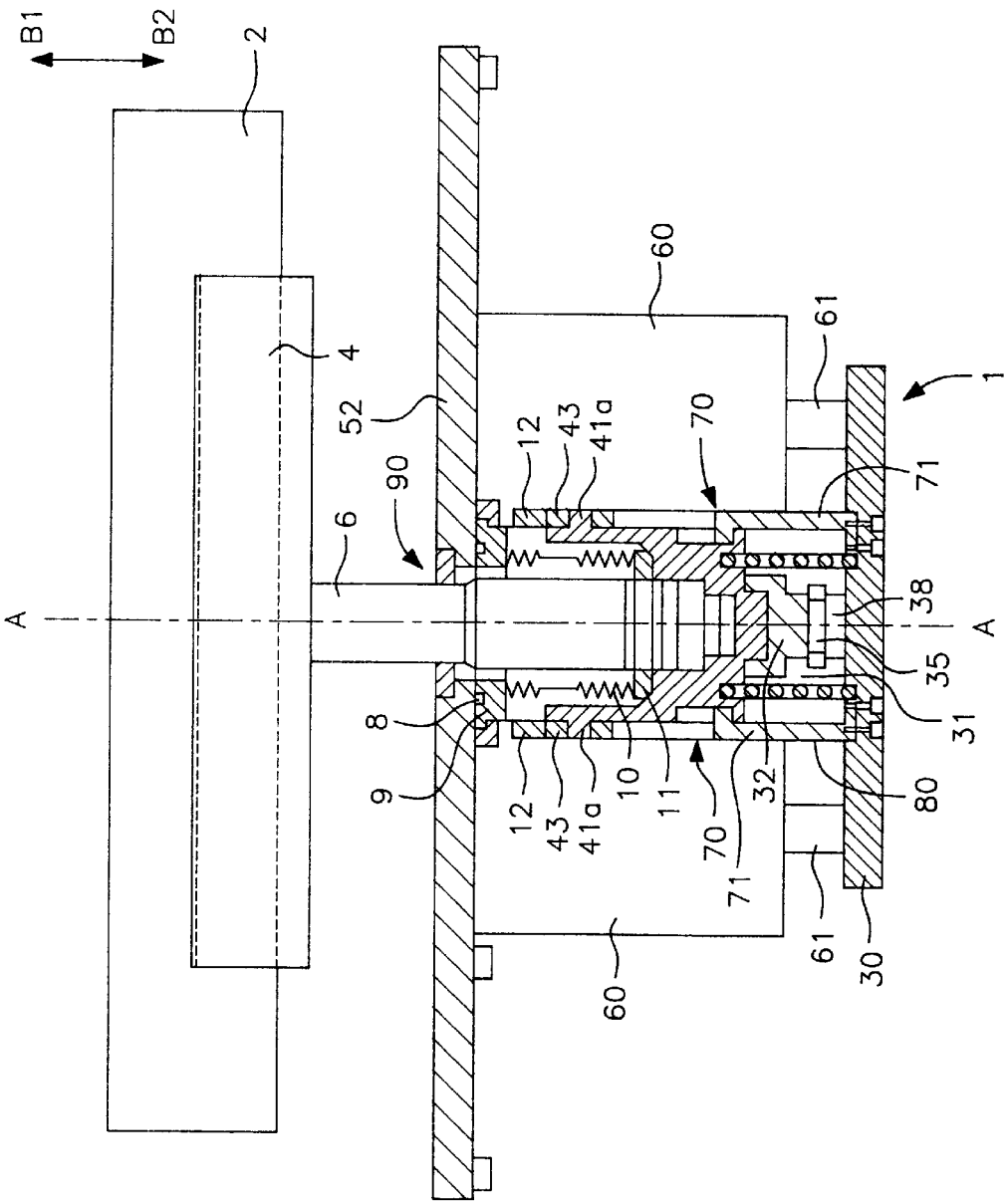
FIG. 10 is a cross-sectional view illustrating a gate valve 1 in the state of closing an aperture 51.
Figure 11:
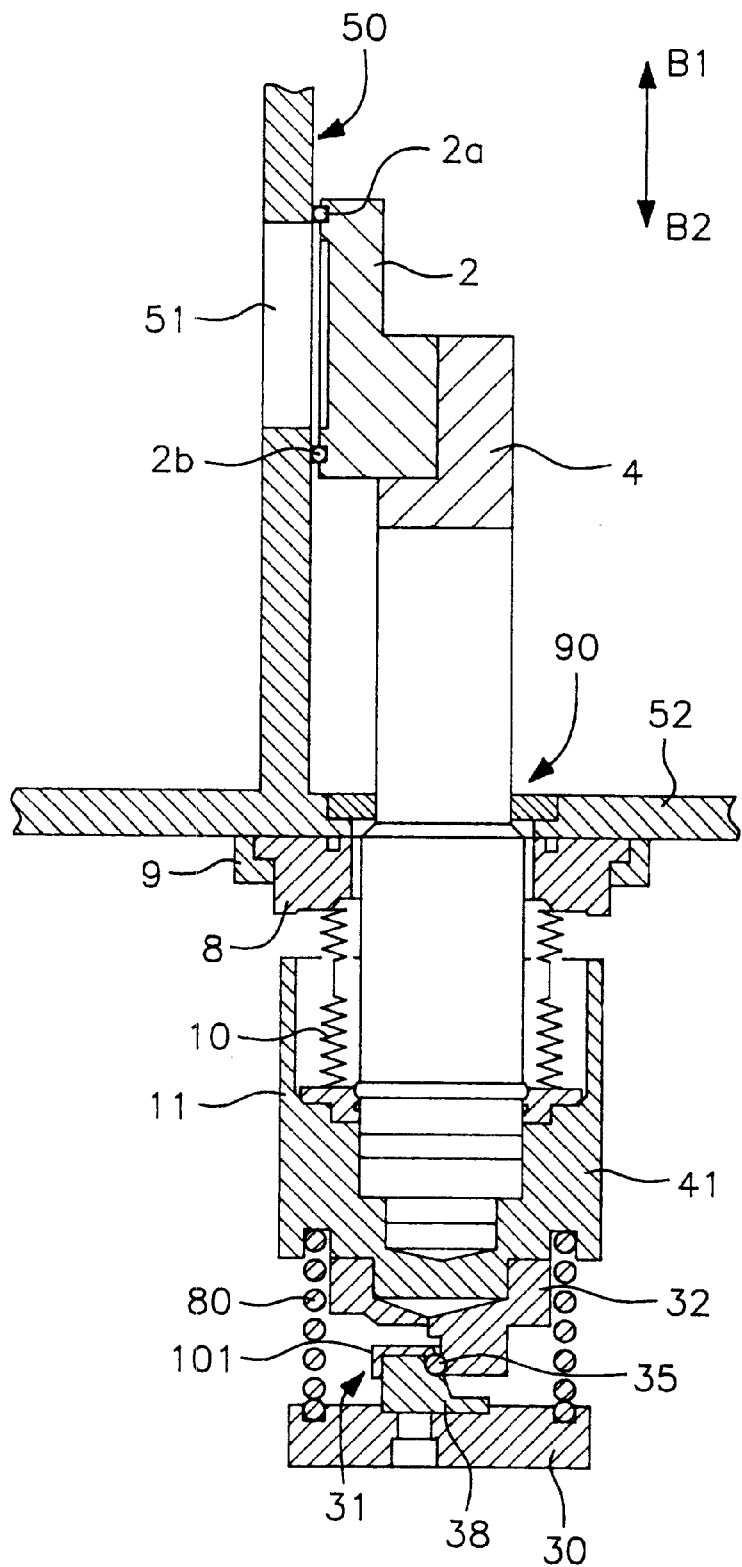
FIG. 11 is a cross-sectional view in the operated state of the gate valve shown in FIG. 10 seen from the line A—A.

By the actuation of the air cylinder 60, as shown in FIG. 10 and FIG. 11, the valve plate 2 moves toward the straight movement direction B1 to the position to close the aperture 51.

At this state, the valve plate 2 is not in the state of sealing the aperture 51. Also, FIG. 11 is a cross-sectional view seen from the line A—A in FIG. 10.

When the valve plate 2 moves toward the straight movement direction B1, the roller supporting member 38 presses the cam member 32 through the roller 35. As shown in FIG. 7, the roller 35 is in the state supported to the supporting portion 32b of the cam surface 32a of the cam member 32.

Further, even in case where the roller supporting member 38 is moved in high speed, the supported state of the roller 35 is maintained by the elastic force of said coil spring 80, so that it is never released. Also, since propulsive force from the roller supporting member 38 to the roller 35 is transmitted directly to the supporting portion 32b of the cam member 32, the valve rod 6 can be moved in high speed.

Figure 12:
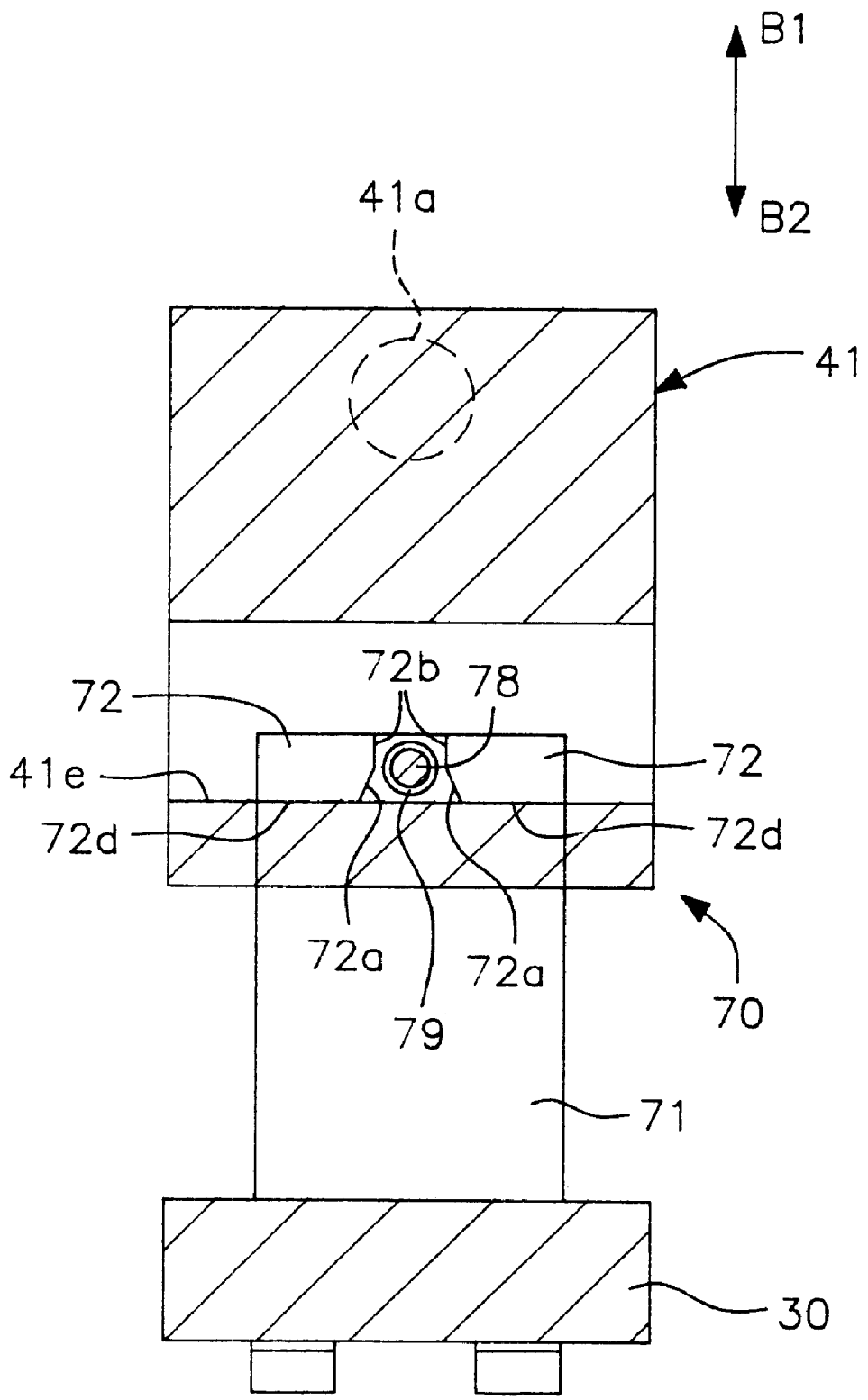
FIG. 12 is a diagram illustrating a state of a seal-releasing cam mechanism 70 in the state that the valve plate 2 is not tilted with respect to the aperture 51.

Meanwhile, as shown in FIG. 12, when the seal-releasing cam mechanism 70 moves toward the straight movement direction B1 of the valve plate 2, it is in the state inserted to the planar portions 72b of the two protruded portions 72 formed at the guide member 71.

Accordingly, the tilting movement of the supporting member 41 around the supporting shaft 41a is restricted so that the valve rod 6 is in the erected state.

When the valve rod 6 arrives a predetermined position by the movement of the roller supporting member 38, the bearing member 43 supporting the supporting shaft 41a of the supporting member 41 is in contact with the stopper member 12, so that the straight movement of the supporting member 41 in the straight movement direction B1 is restricted. Namely, the straight movement of the valve rod 6 in the straight direction B1 is restricted.

Figure 13:
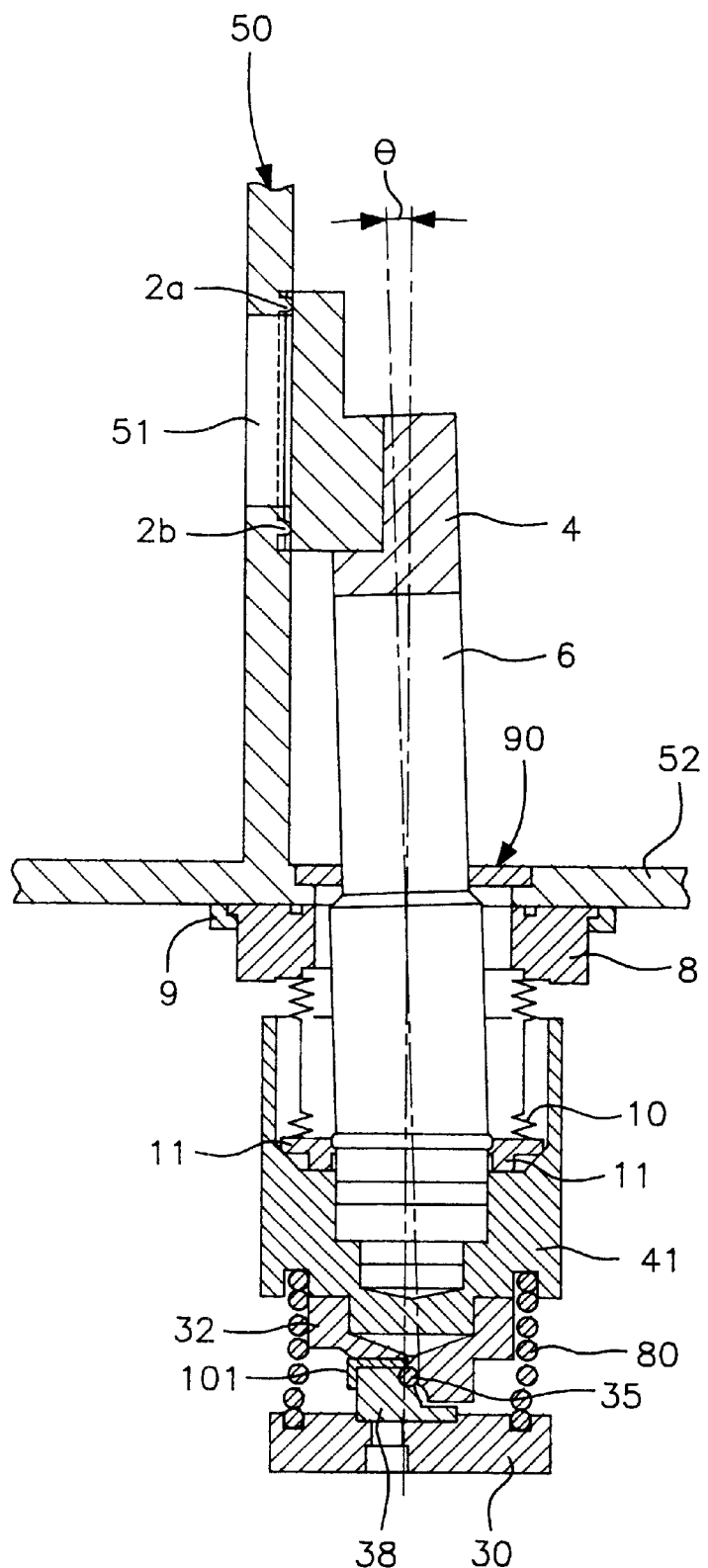
FIG. 13 is a cross-sectional view illustrating the state to seal the aperture by tilting the valve plate in the operation of the gate valve shown in FIG. 11.

At the state that the straight movement of the supporting member 41 in the straight movement direction B1 is restricted, when the straight moving force is supplied again from the air cylinder 60, as shown in FIG. 13, the tilting cam mechanism 31 is operated, and the valve rod 6 is tilted toward the direction where the valve plate 2 seals the aperture 51.

Figure 14:
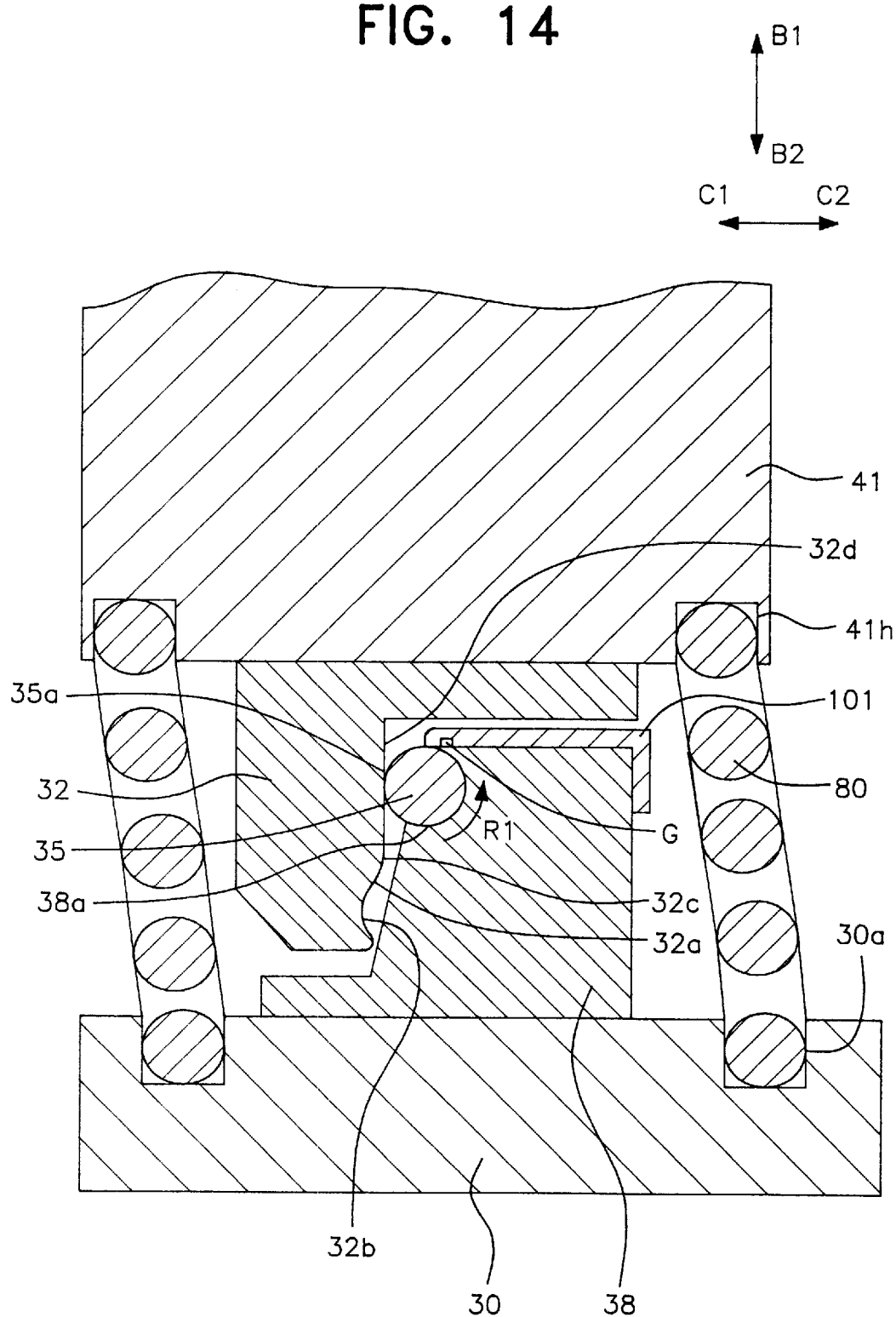
FIG. 14 is a cross-sectional view illustrating the operation of a tilting cam mechanism 31.

At the state that the straight movement of the supporting member 41 in the straight movement direction B1 is restricted, when the roller supporting member 38 is pressed again in the straight movement direction B1 by the air cylinder 60, as shown in FIG. 14, the roller 35 supported on the supporting surface 38a of the roller supporting member 38 begins to roll toward the inclined surface 32c from the supporting portion 32b of the cam member 32, while resisting the elastic force of the coil spring 80.

When the roller 35 begins to roll toward the inclined surface 32c from the supporting portion 32b of the cam surface 32a of the cam member 32, it rotates on the supporting surface 38a of the roller supporting member 38 in the R1 direction shown in FIG. 14. Namely, the rolling surface 35a of the roller 35 slides with respect to the supporting surface 38a.

When the roller 35 rotates in the arrow R1 direction, the lubricant G stored between the lubricant storing member 101 and the rolling surface 35a of the roller 35 is applied to the rolling surface 35a of the roller 35.

The amount of the lubricant G applied to the rolling surface 35a of the roller 35 is restricted to be almost constant by the action of the protruded portion 101c of the lubricant storing member 101.

When the lubricant G is attached to the rolling surface 35a of the roller 35, the rolling surface 35a of the roller 35 and the supporting member 38a of the roller supporting member 38 is lubricated therebetween.

At this time, the lubricant G attached to the rolling surface 35a of the roller 35 lubricates the space between the rolling surface 35a of the roller 35 and the supporting member 38a of the roller supporting member 38, and at the same time, is collected gradually and retained at the groove portion 38b formed at the supporting surface 38a of the roller supporting member 38.

Consequently, the lubricant G becomes the state constantly supplied between the rolling surface 35a of the roller 35 and the supporting surface 38a of the roller supporting member 38.

In this way, the lubricant G is stably supplied between the rolling surface 35a of the roller 35 and the supporting surface 38a of the roller supporting member 38, thereby the sliding friction between the rolling surface 35a and the supporting surface 38a is reduced.

Because the cam surface 32a of the cam member 32 is pressed by a strong force, the rolling surface 35a of the roller 35 is strongly pressed on the supporting surface 38a of the roller supporting member 38 by the reactive force, but, because the sufficient amount of the lubricant G is constantly and stably supplied between the rolling surface 35a and the supporting surface 38a, the generation of friction, noise, vibration of the rolling surface 35a and the supporting surface 38a by the sliding friction is suppressed drastically.

When the roller 35 rolls to the planar portion 32d of the cam member 32, as shown in FIG. 14, the coil spring 80 is compressed with respect to the straight movement directions B1 and B2, and is converted into the tilting directions C1 and C2 of the valve rod 6, so that a restoring force of the coil spring 80 is exerted in the straight movement directions B1 and B2 and the tilting directions C1 and C2 between the connecting plate 30 and the supporting member 41.

When the roller 35 rolls over the cam surface 32a of the roller supporting member 38, as shown in FIG. 13, the valve rod 6 is inclined so that the O-ring 2a provided to the valve plate 2 is pressed to the outer circumference of the aperture 51, and thus, the O-ring 2a is pressed and crushed.

At this time, the straight moving force to the roller supporting member 38 by the air cylinder 60 is amplified by the wedge effect of the inclined surface 32c of the cam member 32, and the force pressing and crushing the O-ring 2a of the valve plate 2 becomes, for example, ten times stronger than the straight moving force. In this way, the valve plate 2 can sufficiently press and crush the O-ring 2a, so that the excellent sealing of the aperture 51 can be conducted.

Figure 15:
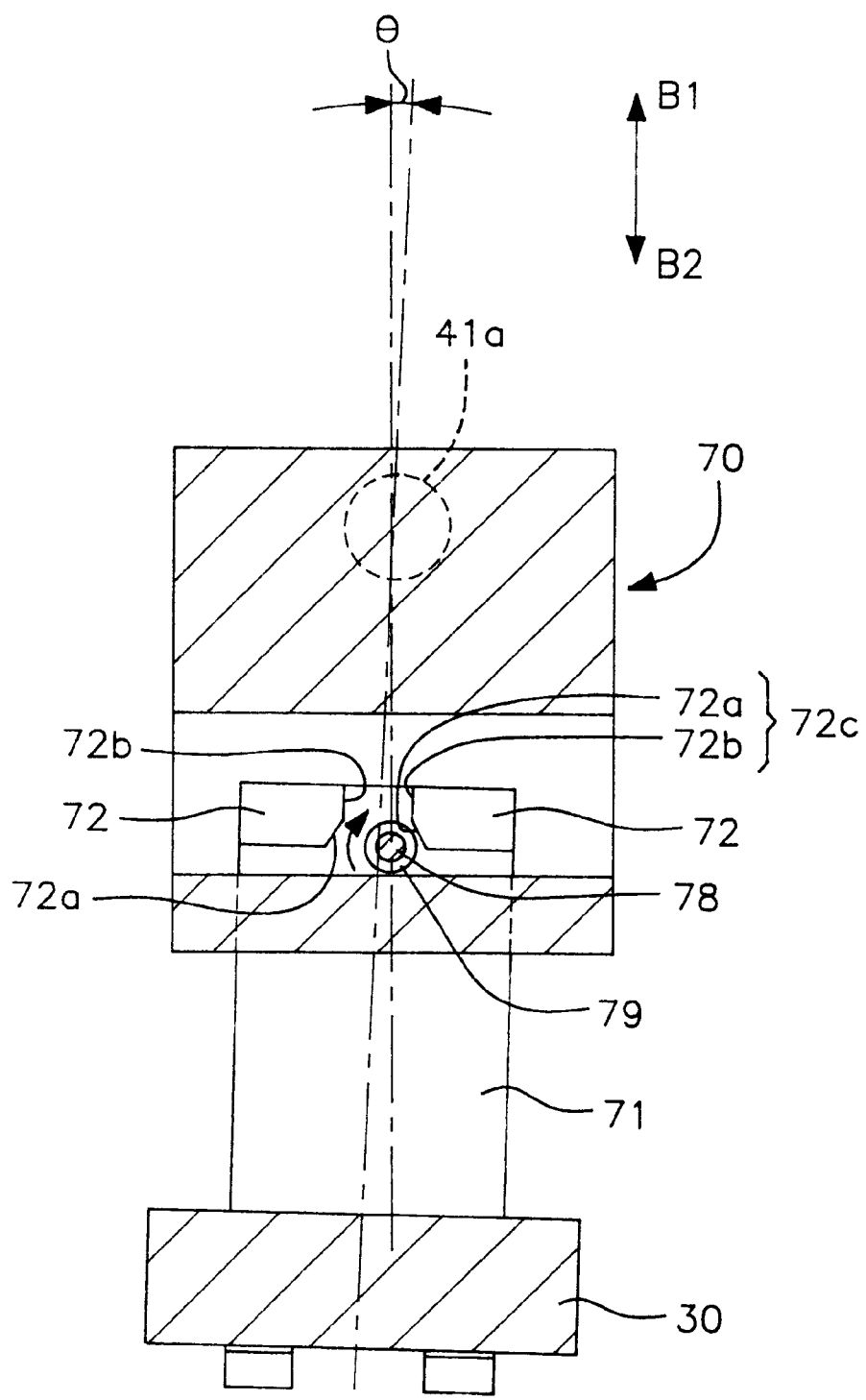
FIG. 15 is a diagram illustrating the state of the seal-releasing cam mechanism 70 in the state that the valve plate 2 seals the aperture 51.
Figure 16:
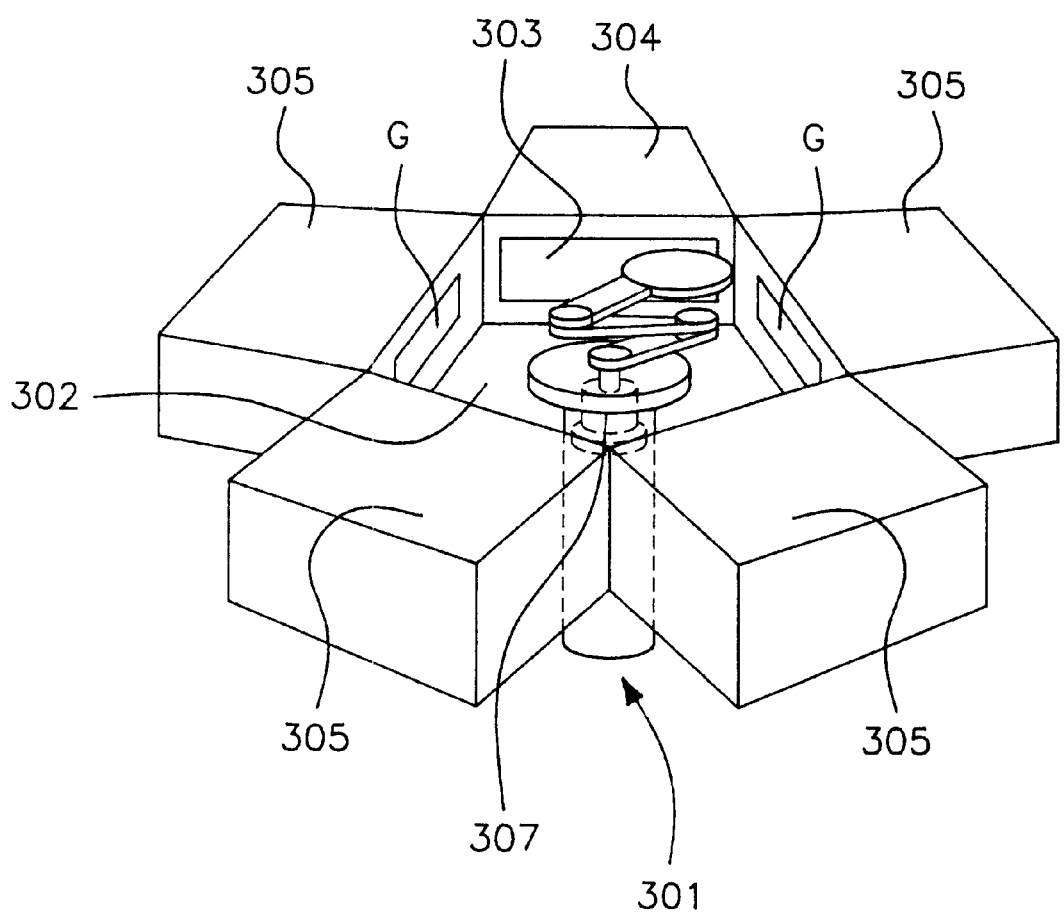
FIG. 16 is a perspective view illustrating an example of a vacuum processing device having a multi-chamber construction.
Figure 17:
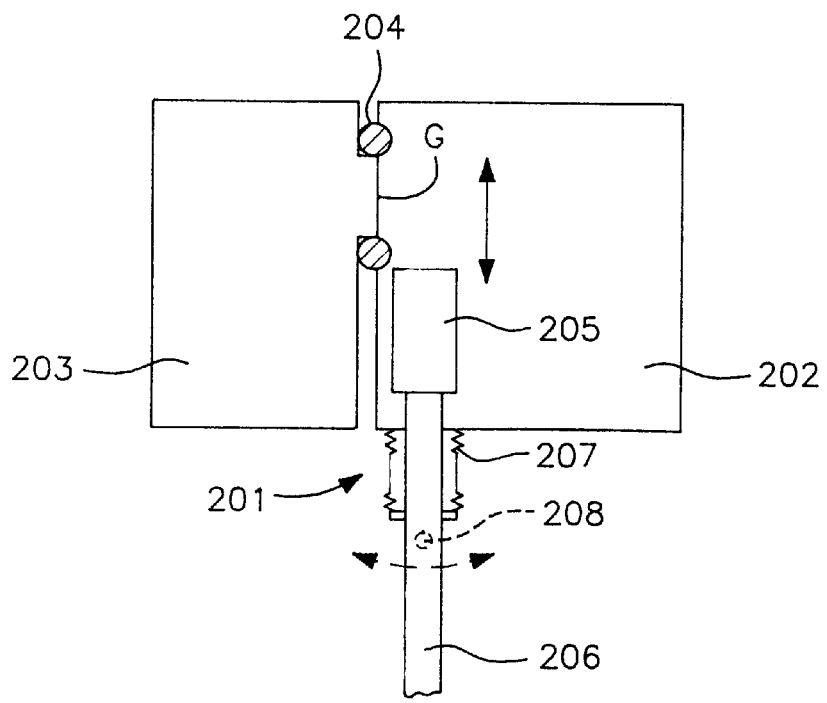
FIG. 17 is a diagram explaining an example of a gate valve structure.
Figure 18:
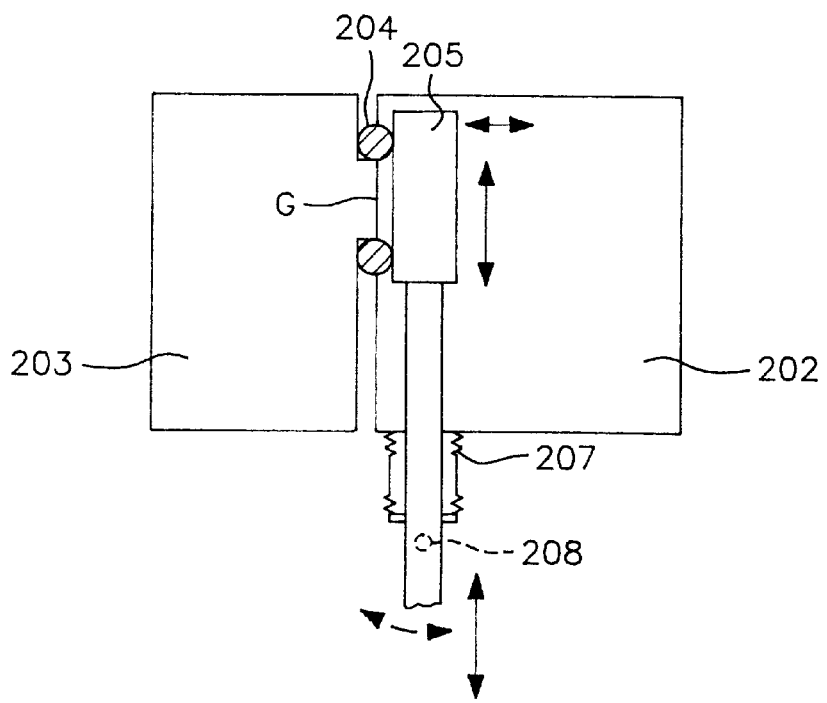
FIG. 18 is a diagram explaining the state that a gate is closed by the gate valve shown in FIG. 17 and is sealed.

Meanwhile, when the tilting of the valve plate 2 is performed, in the seal-releasing cam mechanism 70, according to the tilting of the supporting member 41, the relative positional relationship between the protruded portion 72 of the guide member 71, the supporting member 78 provided in the recess 41d at both sides of the supporting member 41 and the roller member 79 rotatably supported to the supporting member 78 is changed as shown in FIG. 15.

Namely, as shown in FIG. 15, by the tilting of the supporting member 41 and the straight movement of the guide member 71 in the B1 direction, the roller member 79 is taken apart from the planar portion 72b of the protruded portion 72 at one side of the guide member 71, so that it becomes the state of approaching or being in contact with the inclined surface 72a of the protruded portion 72 at one side of the guide member 71 when the tilting movement of the valve plate 2 (the supporting member 41) is completed.

The operation to open the aperture 51 of the air-tight chamber 50 is conducted by actuating the air cylinder 60 in the direction opposite to the above-mentioned direction, that is, by extending the piston rod 61 from the air cylinder 60.

When the air cylinder 60 is actuated in the direction where the valve plate 2 opens the aperture 51, that is, in the B2 direction, in FIG. 15, the connecting plate 30 moves straight in the B2 direction.

When the connecting plate 30 moves straight in the B2 direction, the roller member 79 is in contact with the cam surface 72c of one of the protruded portions 72 of the guide member 71.

In this way, the roller member 79 rolls over the inclined surface 72a of the cam surface 72c to rotate in the arrow direction shown in FIG. 15.

By the rolling of the cam surface 72c of the roller member 79 on the inclined surface 72a, a force exerted in the direction where the valve plate 2 releases the sealing of the aperture 51 compulsively acts on the valve plate 2 (the supporting member 41). And simultaneously, the restoring force of the coil spring 80 acts as the force in the direction where the valve plate 2 releases the sealing of the aperture 51.

Accordingly, for example, even in case where the O-ring 2a is adhered around the aperture 51 by the heat, etc. or there exists the pressure difference which affects to strongly press the valve plate 2 toward the aperture 51 between the air-tight chamber 50 and the air, the sealing of the aperture 51 of the valve plate 2 can be securely released.

When the sealed state of the aperture 51 of the valve plate 2 is compulsively released, the roller member 79 is moved to the position as shown in FIG. 12.

At this state, the contact surface 72d of the two protruded portions 72 of the guide member 71 is in contact with the lateral surface 41e of the recess 41d of the supporting member 41.

Next, when the air cylinder 60 is moved straight in the direction to open the aperture 51, that is, in the B2 direction, the supporting member 41 is pulled in the B2 direction by the contact surface 72d of the guide member 71, so that the aperture 51 is opened.

Moreover, in the tilting cam mechanism 31, by releasing compulsively the sealed state of the aperture 51 of said valve plate 2, the roller 35 rolls over the inclined surface 32c by the restoring force of the coil spring 80 from the state that it is positioned on the planar surface 32d of the cam member 32, and again, is supported on the supporting member 32b, thereby the valve rod 6 is erected.

In this case, the roller 35 rotates over the supporting surface 38a of the roller supporting member 38 in an opposite direction to the above-mentioned R1, and the lubricant G is attached to the rolling surface 35a of the roller 35.

As described above, in the gate valve according to the present embodiment, there is provided a construction in which the tilting cam mechanism 31 for tilting the valve rod 6 employs the roller 35 so that the rolling surface 35a of the roller 35 is rotatably supported on the supporting surface 38a of the roller supporting member 38, and the roller 35 rolls the cam surface 32a of the cam member 32. Moreover, there is provided a construction in which the lubricant G is supplied stably and sufficiently by the lubricant storing member 101 for the rolling surface 35a of the roller 35 which slides over the supporting surface 38a of the roller supporting member 38.

Because the gate valve according to the present embodiment has the above-mentioned construction, it is difficult due to the constructive limitation to provide the function to compulsively release the sealed state of the aperture 51 of the valve plate 2 to the tilting cam mechanism 31, and thus, the seal-releasing cam mechanism 70 is provided independently of the tilting cam mechanism 31, and is constructed to compulsively release the sealed state of the aperture 51 of the valve plate 2.

Further, according to the present embodiment, since the gate valve is constructed to rotatably support the roller member 79 of the seal-releasing cam mechanism 70 and roll on the cam surface 72c formed at the guide member 71, the abrasion of the roller member 79 by the friction is reduced, and when the sealing of the aperture 51 of the valve plate 2 is operated to be released, the generation of vibration and noise can be reduced.

Finally, according to the gate valve according to the present embodiment, the space between the air-tight chamber 50 and the valve rod 6 is sealed simply by means of the seal bellows 10, and in addition, the dust seal portion 90 is provided between the air-tight chamber 50 and the valve rod 6, and the dust produced from the air-tight chamber 50 side is prevented from intruding into the seal bellows 10.

Accordingly, breakage and destruction caused by the intrusion of the dust into the seal bellows 10 can be suppressed, and thus, the reliability of the seal bellows 10 can be improved.

The present invention is not limited to the above-mentioned embodiment.

In the above-mentioned embodiment, there is provided the construction in which the cam member 32 is connected to the valve rod 6 (the supporting member 41), and the roller supporting member 38 is directly actuated by the air cylinder 60 through the connecting plate 30, however, for instance, there may be provided the construction in which the roller supporting member 38 is directly connected to the valve rod 6 (the supporting member 41), and the cam member 32 is directly actuated by the air cylinder 60.

Further, in the above-mentioned embodiment, although the description has been made with respect to the case of the roller 35 as the rolling body, for example, a sphere can be used.

According to the present invention, in the cam mechanism of the gate valve, the structure thereof can be simple and small-sized and inexpensive, and the movement thereof can be smooth in high speed, thereby excellent silence and high reliability can be provided.

Moreover, according to the present invention, the sealing of the aperture in the air-tight chamber can be securely released by the valve plate.

What is claimed is:

1. A gate valve having an air-tight chamber with an aperture, comprising:
    a valve plate provided in the air-tight chamber, for opening and closing the aperture of the air-tight chamber and sealing the aperture by tilting with respect to the aperture;
    a valve rod having one end to which said valve plate is fixed, said valve rod being supported to be movable in a predetermined straight movement direction for opening and closing the aperture, said valve rod being able to tilt around a predetermined tilting axis;
    a sealing means for sealing a portion between said valve rod and said air-tight chamber;
    a restriction means for restricting a straight movement in such a direction that the aperture of said valve plate is closed at a closed position where the valve plate closes the aperture;
    a tilting cam mechanism which converts straight moving force into tilting force, and tilts said valve rod of which the straight movement is restricted at said closed position around said tilting axis in such a direction that said valve plate seals the aperture;
    a seal-releasing cam mechanism provided independently of said tilting cam mechanism for tilting said valve rod around said tilting axis in such a direction as to release the sealing of said valve plate in the state of sealing the aperture by supplying the straight moving force in such a direction as to open the aperture; and
    an actuating means for supplying the straight moving force to said tilting cam mechanism and said seal-releasing cam mechanism.

2. A gate valve according to claim 1, wherein said tilting cam mechanism comprises:
    a rolling body having a rolling surface;
    a rolling body supporting member for supporting said rolling body, which has a supporting surface for supporting the rolling surface of said rolling body so that said rolling body can be rotated;
    a tilting cam member facing said rolling body supporting member, and having a cam surface on which said rolling body rolls to tilt said valve rod, said tilting cam member being connected to said valve rod; and
    a lubricant storing member including an opposing surface which faces a part of the rolling surface of the rolling body rotatably supported to said rolling body supporting member, said lubricant storing member storing a lubricant in a gap formed between the rolling surface and the opposing surface.

3. A gate valve according to claim 1, wherein said seal-releasing cam mechanism comprises:
    a roller member;
    a supporting member for rotatably supporting said roller member; and a seal-releasing cam member including a cam surface on which said roller member rolls.

4. A gate valve according to claim 3, wherein said roller member and said supporting member are provided at a side of said valve rod, and said seal-releasing cam member is provided at a side of said actuating means.

5. A gate valve according to claim 1, wherein said sealing means comprises:

a seal bellows portion which can be expanded and contracted, and has one end fixed to said valve rod and the other end fixed to said air-tight chamber side; and a dust seal portion which said valve rod is inserted into and prevents a dust produced in said air-tight chamber from intruding into said seal bellows portion while allowing the tilting of said valve rod.

6. A gate valve having an air-tight chamber with an aperture, comprising:

a valve plate, a valve rod fixed to the valve plate, the valve-rod being able to tilt, a tilting cam mechanism which converts straight moving force into tilting force and tilts the valve rod the straight movement of which is restricted at a closed position, in such a direction that the valve plate seals the aperture, a seal-releasing cam mechanism which tilts the valve plate in such a direction that the sealing of the valve plate is released, a roller member;

a supporting member for rotatably supporting said roller member; and a seal-releasing cam member including a cam surface on which said roller member rolls.

7. A gate valve having an air tight chamber with an aperture, comprising:

a valve plate, a valve rod fixed to the valve plate, the valve rod being able to tilt;

a tilting cam mechanism which converts straight movement force into tilting force and tilts the valve rod the straight movement of which is restricted at a closed position, in such a direction that the valve plate seals the aperture;

a seal-releasing cam mechanism which tilts the valve plate in such a direction that the sealing of the valve plate is released;

a rolling body having a rolling surface;

a rolling body supporting member for supporting said rolling body, which has a supporting surface for supporting the rolling surface of said rolling body so that said rolling body can be rotated;

a tilting cam member facing said rolling body supporting member, and having a cam surface on which said rolling body rolls to tilt said valve rod, said tilting cam member being connected to said valve rod; and a lubricant storing member including an opposing surface which faces a part of the rolling surface of the rolling body rotatably supported to said rolling body supporting member, said lubricant storing member storing a lubricant in a gap formed between the rolling surface and the opposing surface, the opposing surface of the lubricant storing member having at an end portion thereof and a protruded portion for restricting the amount of the lubricant attached to the rolling surface so as to maintain the amount constant.

* * * * *